(12) United States Patent
Piemonte et al.

(10) Patent No.: US 9,200,919 B2
(45) Date of Patent: Dec. 1, 2015

(54) METHOD, SYSTEM AND APPARATUS FOR SELECTIVELY OBTAINING MAP IMAGE DATA ACCORDING TO VIRTUAL CAMERA VELOCITY

(75) Inventors: Patrick S. Piemonte, San Francisco, CA (US); Billy P. Chen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 13/594,155

(22) Filed: Aug. 24, 2012

(65) Prior Publication Data
US 2013/0321472 A1    Dec. 5, 2013

Related U.S. Application Data

(60) Provisional application No. 61/655,831, filed on Jun. 5, 2012.

(51) Int. Cl.
| | | |
|---|---|---|
| *G06T 17/00* | (2006.01) | |
| *G01C 21/36* | (2006.01) | |
| *G06T 15/20* | (2011.01) | |
| *G06T 17/05* | (2011.01) | |
| *G06F 1/16* | (2006.01) | |

(52) U.S. Cl.
CPC .......... *G01C 21/3638* (2013.01); *G01C 21/367* (2013.01); *G01C 21/3664* (2013.01); *G06F 1/1626* (2013.01); *G06F 1/1694* (2013.01); *G06T 15/20* (2013.01); *G06T 17/05* (2013.01); *G06F 2200/1637* (2013.01); *G06F 2203/04806* (2013.01); *G06T 2210/36* (2013.01)

(58) Field of Classification Search
CPC .......... G01C 21/3664; G01C 21/3638; G01C 21/3682; G01C 21/3673; G01C 21/3667; G06T 19/00; G06T 15/00; G06T 17/05; G06F 3/041
USPC ......................................................... 345/419
See application file for complete search history.

(56) References Cited

U.S. PATENT DOCUMENTS

| | | |
|---|---|---|
| 5,999,187 A | 12/1999 | Dehmlow et al. |
| 7,075,535 B2 | 7/2006 | Aguera y Arcas |
| 7,925,429 B2 * | 4/2011 | Geelen ........................ 701/455 |
| 8,103,439 B2 * | 1/2012 | Onishi et al. ................. 701/410 |
| 8,386,173 B2 * | 2/2013 | Muzina et al. ............... 701/455 |
| 2005/0218331 A1 * | 10/2005 | Blevis et al. ............. 250/370.09 |
| 2010/0045666 A1 * | 2/2010 | Kornmann et al. .......... 345/419 |
| 2011/0018881 A1 | 1/2011 | Nash |
| 2012/0050256 A1 | 3/2012 | Thiel et al. |
| 2012/0062748 A1 * | 3/2012 | Ofek et al. ................... 348/149 |
| 2013/0004014 A1 * | 1/2013 | Hickman ..................... 382/100 |

\* cited by examiner

*Primary Examiner* — Charles Tseng
(74) *Attorney, Agent, or Firm* — Robert C. Kowert; Meyertons, Hood, Kivlin, Kowert & Goetzel, P.C.

(57) ABSTRACT

Methods, systems and apparatus are described to selectively obtain map image data according to virtual camera velocity. Embodiments may display a map view of a map using a virtual camera. Some embodiments may detect a velocity of the virtual camera. Embodiments may then determine map image data for the map view of the map according to the velocity of the virtual camera and obtain the determined map image data. In at least some embodiments, a level-of-detail may be specified for map image data according to the velocity. Map image data may be obtained corresponding to this level-of-detail from a map service or from accessing local storage.

25 Claims, 15 Drawing Sheets

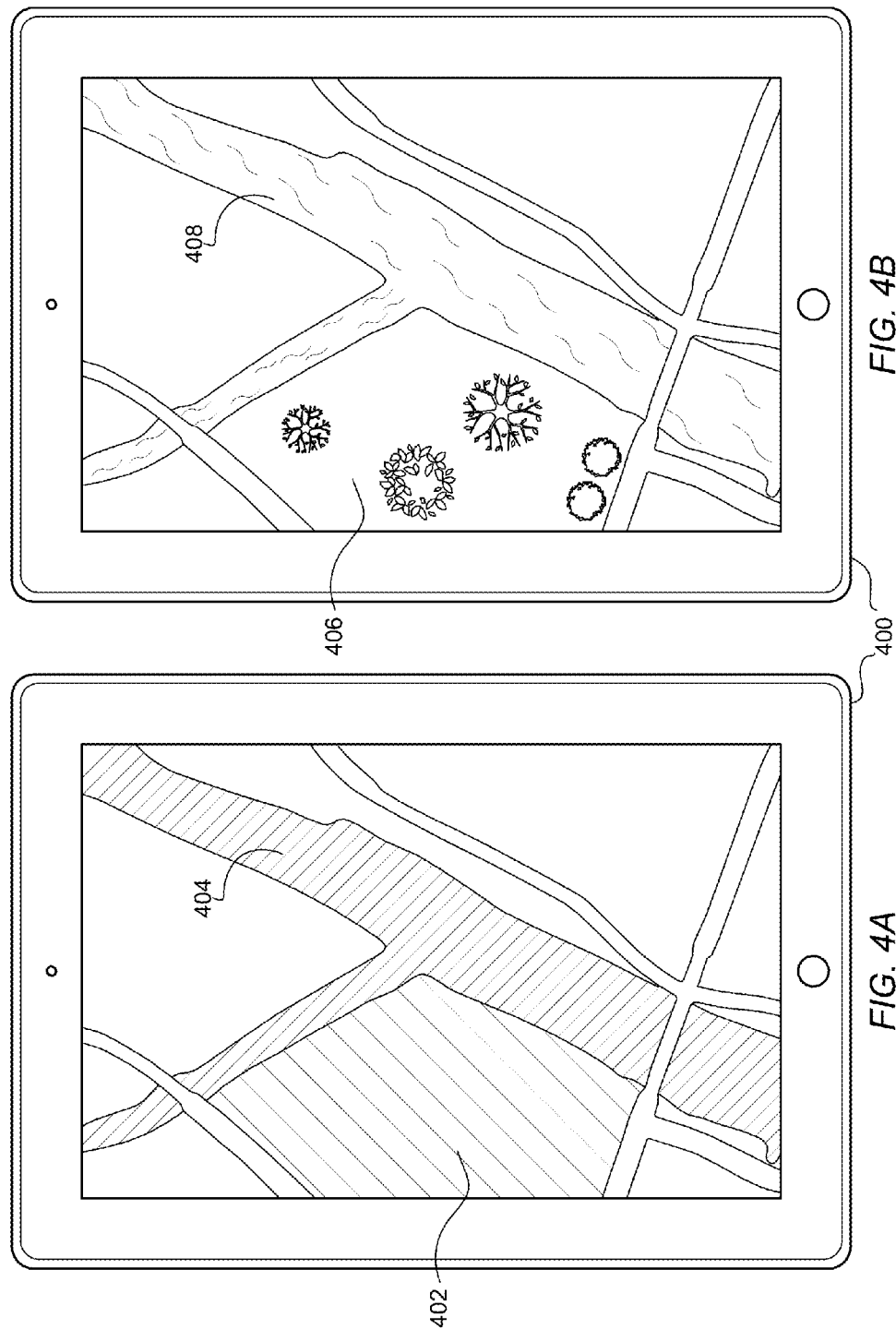

METHOD, SYSTEM AND APPARATUS FOR SELECTIVELY OBTAINING MAP IMAGE DATA ACCORDING TO VIRTUAL CAMERA VELOCITY

This application claims benefit of priority to U.S. Provisional Application Ser. No. 61/655,831, entitled "Method, System And Apparatus For Selectively Obtaining Map Image Data According To Virtual Camera Velocity," filed Jun. 5, 2012.

BACKGROUND

Description of the Related Art

Mobile computing is an expanding field of technological development. Advances in mobile communications, mobile hardware, and mobile software applications are continually developing new solutions for existing limitations in the field and providing innovative products for consumers. As part of the growing demand for mobile software applications, map displays and navigation applications provide a user with various forms of maps, navigation, and direction information. Often, map image data is manipulated and displayed by mobile devices, such as mobile phones, personal digital assistants, tablet computers, or laptop computers. Interactivity with these applications increases the processing demand on a mobile device which, if not accounted for, may lead to bad user experiences or application failure. To account for an application's demand on a mobile device's resources, application designers may attempt to reduce the size or quantity of transactions necessary to perform mobile software applications.

SUMMARY

Various embodiments of methods, apparatus, and computer-readable storage media for selectively obtaining map image data according to virtual camera velocity are described. An electronic or computing device, such as a laptop, desktop computer, mobile phone, personal digital assistant (PDA), portable multi-function device or tablet computer may implement selectively obtaining map image data according to virtual camera velocity. Embodiments may implement a map application configured to display a map view of a map. Some embodiments may use a virtual camera for a map view of a map, to determine map image data in the map view for two or three-dimensions. This virtual camera may be moved throughout virtual space to provide various views of the map image data. Users and/or other input devices may move the virtual camera through touch-sensitive devices, orientation sensors, and location data. In some embodiments, a navigation system may provide continuous movement of a virtual camera along a route on a map. As the virtual camera moves, its velocity may be calculated. Embodiments may then determine map image data indicating a level-of-detail for the map image data, the level-of-detail is determined according to the velocity of the virtual camera. In some embodiments, the distance between the virtual camera and the observed map image data may specify the level-of-detail of map image data an embodiment may indicate. Embodiments may then obtain the determined map image data. Embodiments may obtain map image data from a server, such as a map service, and/or by accessing locally stored map image data. Embodiments may then render the map image data. Some embodiments may then display the map image data to a viewer of a display device, and/or store the image for further processing in local storage or by other applications.

BRIEF DESCRIPTION OF THE DRAWINGS

FIGS. 4a and 4b illustrate an example display of map data selectively obtained according to virtual camera velocity, according to some embodiments.

Figure 1:
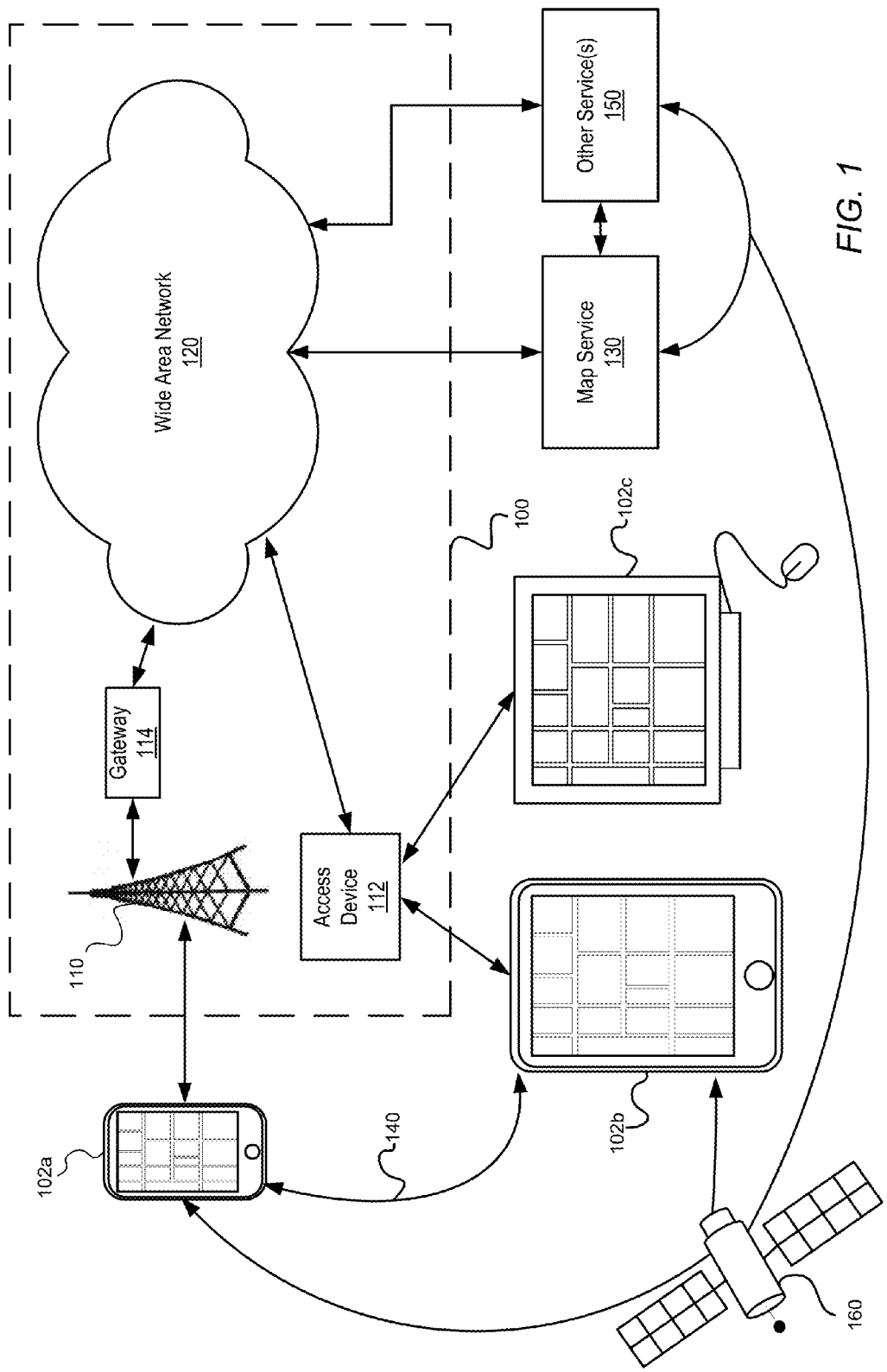
FIG. 1 illustrates a map service operating environment, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Some portions of the detailed description which follow are presented in terms of algorithms or symbolic representation of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software and other programmable electronic devices. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Various embodiments of methods, apparatus, and computer-readable storage media for selectively obtaining map image data according to virtual camera velocity are described herein. Some embodiments may selectively obtain map image data according to virtual camera velocity suitable for rendering and/or displaying a map. An electronic or computing device, such as a mobile phone, personal digital assistant (PDA), laptop computer, tablet computer, or portable multifunction device, may in some embodiments selectively obtain map image data according to virtual camera velocity. Embodiments may implement a display technique well-known to those of ordinary skill in the art, a virtual camera. A virtual camera simulates in virtual space a camera observing image data, just as a physical camera would capture image data. Embodiments may determine a level-of-detail for the map image data to render according to the map image data observed by a virtual camera. A virtual camera may observe both two-dimensional and three-dimensional maps and may operate in two or three dimensions. As a physical camera may change position, so too a virtual camera may move between locations in virtual space. In various embodiments, a device may detect the velocity of the virtual camera as it moves between locations. In obtaining the observed map image data, a device may do so according to the velocity of the virtual camera. Once obtained, a device may then render and/or display the obtained map image data.

Detecting the velocity of a virtual camera may be determined through various techniques and devices. Velocity commonly defined is the distance an object travels divided according to the length of travel time. Embodiments may implement many forms of input to manipulate a virtual camera, which in turn manipulates the virtual camera's velocity. Some embodiments may allow touch input on a touch sensitive input device to manipulate the virtual camera. For example, a leftward swipe gesture may direct the virtual camera to shift to the right. Some embodiments may allow orientation sensors on a device to detect changes in the device orientation or movement to manipulate a virtual camera. Location data, usually but not limited to data obtained from a location component or location services, such as Assisted Global Positioning Satellites (A-GPS), may also manipulate the virtual camera. In some embodiments virtual camera velocity may include detecting the rotation of a virtual camera on or about a fixed point.

In order to obtain observed map image, some embodiments may determine whether the detected virtual camera velocity exceeds a velocity threshold. There may be one or more velocity thresholds, which may be determined according to various factors, such as map image data type, for example raster graphics data or vector graphics data, virtual camera manipulation input type, such as touch, orientation sensor, or location component, or the map image data location within the larger virtual space relative to the virtual camera location. For example, in a three-dimensional map image with a map view looking out to the horizon, the map image data representing the horizon may have a very high velocity threshold, because little map image data viewable to an observer changes at a low or high velocity.

Embodiments may then specify a level-of-detail for the map image data according in response to the determination that the detected velocity of the virtual camera exceeds the velocity threshold. This specification may be implemented by selecting a level-of-detail of the map image data corresponding to the data's relative distance from the virtual camera in virtual space. For example, image data close to the virtual camera may be specified with a low level-of-detail, while image data further away is specified at a high level-of-detail. A device may obtain the determined map image data corresponding to this specified level-of-detail. In some embodiments, a device may obtain the map image data from a server, such as a map service. A device may, in some embodiments, access stored map image data, such as memory located on an implementing device. Some embodiments may determine whether all of the determined map image data for the map view of the map according to the velocity of the virtual camera is obtained. In response to determining that all of the determined map image data for the map view of the map according to the velocity of the virtual camera is obtained, embodiments may determine the map image data of the map without reference to the virtual camera velocity and obtain the newly determined map image data.

Embodiments of selectively obtaining map image data according to virtual camera velocity may be implemented in any application that supports rendering and/or displaying map image data. Example categories of applications in which embodiments may be implemented in are map displays, such as in navigation devices, electronic games, which may include rendering or displaying in-game maps, and graphical design, which may allow users to create two-dimensional and three-dimensional maps. More generally, embodiments may be implemented in applications that allow map image data to be rendered and/or displayed. Specific examples of applications or technologies in which embodiments may be implemented include, but are not limited to, mapping or navigation software applications on an iPod Touch®, iPhone®, or iPad® devices from Apple Inc. of Cupertino, Calif.

Figure 8:
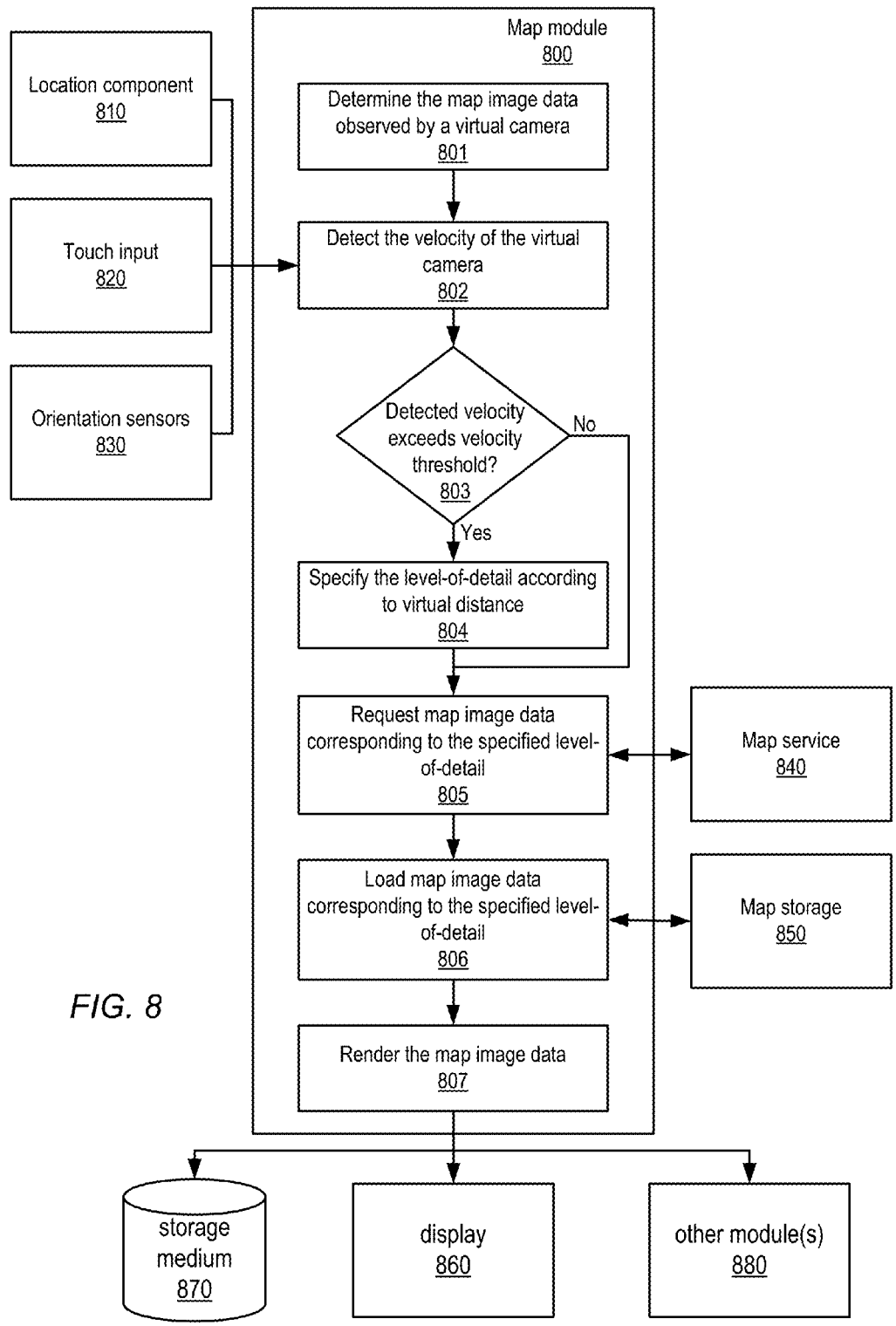
FIG. 8 illustrates a map module implementing a method to selectively obtain map data according to virtual camera velocity, according to some embodiments.

Embodiments of selectively obtaining map image data according to virtual camera velocity may be implemented and performed by a module or modules implemented by program instructions stored in a non-transitory computer-readable storage medium and executable by one or more processors, such as one or more CPUs or GPUs. An example module that may implement some embodiments, and an example application that may implement the module, as described herein, is illustrated in FIG. 8. An example electronic device on which embodiments may be implemented is illustrated in FIGS. 8 through 11. An example system on which embodiments may be implemented is illustrated in FIG. 12.

Map Service Operating Environment

Various embodiments may operate within a map service operating environment. FIG. 1 illustrates a map service operating environment, according to some embodiments. A map service 130 may provide map services for one or more client devices 102*a*-102*c* in communication with the map service 130 through various communication methods and protocols. A map service 130 generally may provide map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 102*a*-102*c* may utilize these map services by obtaining map service data. Client devices 102*a*-102*c* may implement various techniques to process map service data. Client devices 102*a*-102*c* may then provide map services to various entities, including, but not limited to, users, internal software or hardware modules, and/or other systems or devices external to the client devices 102*a*-102*c*.

In some embodiments, a map service may be implemented by one or more nodes in a distributed computing system. Each node may be assigned one or more services or components of a map service. Some nodes may be assigned the same map service or component of a map service. A load balancing node may distribute access or requests to other nodes within a map service. In some embodiments a map service may be implemented as a single system, such as a single server. Different modules or hardware devices within a server may implement one or more of the various services provided by a map service.

A map service may provide map services by generating map service data in various formats. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map may produce the original map. Tiles may be generated from map image data, routing or navigation data, or any other map service data. In some embodiments map tiles may be raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or a Drawing File (.drw). Embodiments may also include tiles with a combination of vector and raster data. Metadata or other information pertaining to the map tile may also be included within or along with a map tile, providing further map service data to a client device. In various embodiments, a map tile may be encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associate with one or more textures. Embodiments may also analyze map tiles for specified features that may be associated with certain map styles that contain style identifiers.

Other map services may generate map service data relying upon data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 102a-102c) may be implemented on different device types. Examples of a portable-multifunction device include the devices illustrated in FIGS. 8 through 11, such as multifunction device 1200 and multifunction device 1400. Client devices 102a-102c may utilize map service 130 through various communication methods and protocols described below. In some embodiments, client devices 102a-102c may obtain map service data from map service 130. Client devices 102a-102c may request or receive map service data. Client devices 102a-102c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. Embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 1 illustrates one possible embodiment of an operating environment 100 for a map service 130 and client devices 102a-102c. In some embodiments, devices 102a, 102b, and 102c can communicate over one or more wire or wireless networks 110. For example, wireless network 110, such as a cellular network, can communicate with a wide area network (WAN) 120, such as the Internet, by use of gateway 114. A gateway 114 may provide a packet oriented mobile data service, such as General Packet Radio Service (GPRS), or other mobile data service allowing wireless networks to transmit data to other networks, such as wide area network 120. Likewise, access device 112 (e.g., IEEE 802.11g wireless access device) can provide communication access to WAN 120. Devices 102a and 102b can be any portable electronic or computing device capable of communicating with a map service, such as a portable multifunction device described below with respect to FIGS. 8 to 11. Device 102c can be any non-portable electronic or computing device capable of communicating with a map service, such as a system described below in FIG. 12.

In some embodiments, both voice and data communications can be established over wireless network 110 and access device 112. For example, device 102a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 110, gateway 114, and WAN 120 (e.g., using Transmission Control Protocol/Internet Protocol (TCP/IP) or User Datagram Protocol (UDP)). Likewise, in some implementations, devices 102b and 102c can place and receive phone calls, send and receive e-mail messages, and retrieve electronic documents over access device 112 and WAN 120. In various embodiments, any of the illustrated client device may communicate with map service 130 and/or other service(s) 150 using a persistent connection established in accordance with one or more security protocols, such as the Secure Sockets Layer (SSL) protocol or the Transport Layer Security (TLS) protocol.

Devices 102a and 102b can also establish communications by other means. For example, wireless device 102a can communicate with other wireless devices (e.g., other devices 102a or 102b, cell phones) over the wireless network 110. Likewise devices 102a and 102b can establish peer-to-peer communications 140 (e.g., a personal area network) by use of one or more communication subsystems, such as Bluetooth® communication from Bluetooth Special Interest Group, Inc. of Kirkland, Wash. 102c can also establish peer to peer communications with devices 102a or 102b. (not pictured). Other communication protocols and topologies can also be implemented. Devices 102a and 102b may also receive Global Positioning Satellite (GPS) signals from GPS 140.

Devices 102a, 102b, and 102c can communicate with map service 130 over the one or more wire and/or wireless networks, 110 or 112. For example, map service 130 can provide a map service data to rendering devices 102a, 102b, and 102c. Map service 130 may also communicate with other services 150 to obtain data to implement map services. Map service 130 and other services 150 may also receive GPS signals from GPS 140.

In various embodiments, map service 130 and/or other service(s) 150 may be configured to process search requests from any of client devices. Search requests may include but are not limited to queries for business, address, residential locations, points of interest, or some combination thereof. Map service 130 and/or other service(s) 150 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 130 and/or other service(s) 150 may be configured to provide auto-complete search results that may be displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the internet) by map service 130 and/or other service(s) 150, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device may be configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 130 and/or other service(s) 150 may provide one or more feedback mechanisms to receive feedback from client devices 102*a-c*. For instance, client devices may provide feedback on search results to map service 130 and/or other service(s) 150 (e.g., feedback specifying ratings, reviews, temporary or permanent business closures, errors etc.); this feedback may be used to update information about points of interest in order to provide more accurate or more up-to-date search results in the future. In some embodiments, map service 130 and/or other service(s) 150 may provide testing information to the client device (e.g., an A/B test) to determine which search results are best. For instance, at random intervals, the client device may receive and present two search results to a user and allow the user to indicate the best result. The client device may report the test results to map service 130 and/or other service(s) 150 to improve future search results based on the chosen testing technique, such as an A/B test technique in which a baseline control sample is compared to a variety of single-variable test samples in order to improve results.

Workflow of Selectively Obtaining Map Image Data

Figure 2:
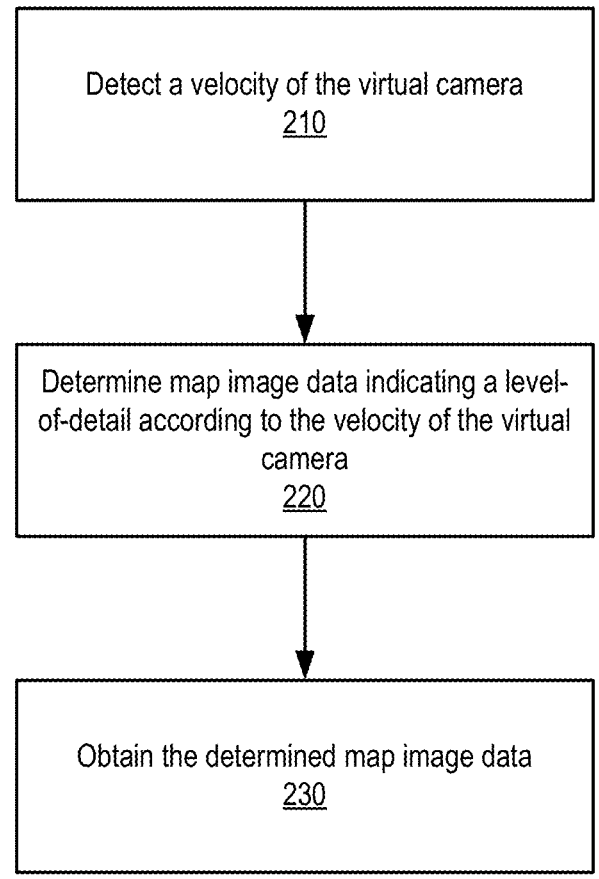
FIG. 2 illustrates a flowchart for a method of selectively obtaining map image data according to virtual camera velocity, according to some embodiments.

A map display device, such as an electronic navigation system or portable multi-function device, such as described below with respect to FIGS. 8 through 11, may implement a map application, map component, or navigation component configured to display a map. To display a map various embodiments of the map application, map component, or navigation component may display a map view using a virtual camera. A virtual camera may determine for a map application, map component, or navigation component the map image data to render for a given map view. Various embodiments allow the virtual camera to be manipulated, or moved, from one location to another, creating virtual camera velocity. FIG. 2 illustrates a high-level flowchart of a method of selectively obtaining map image data according to virtual camera velocity, in some embodiments.

Maps are commonly geographic representations of information displayed to an observer. Map image data, therefore, is a digital representation of a map utilizing digital graphics. Map image data may be composed or encoded using many different image formats, including, but not limited to, raster image formats, such as Bitmap (.bmp), Graphics Interchange Format (.gif), Joint Photographic Experts Group (.jpg, .jpeg, etc.), Portable Networks Graphic (.png), or Tagged Image File Format (.tiff), and/or vector image formats, such as Scalable Vector Graphics (.svg) or Drawing File (.drw). Map image data may be a combination of diverse graphics formats. Moreover, portions of map image data, commonly known as map tiles and discussed above with regard to FIG. 1, may also be utilized to implement map image data.

Figure 3B:
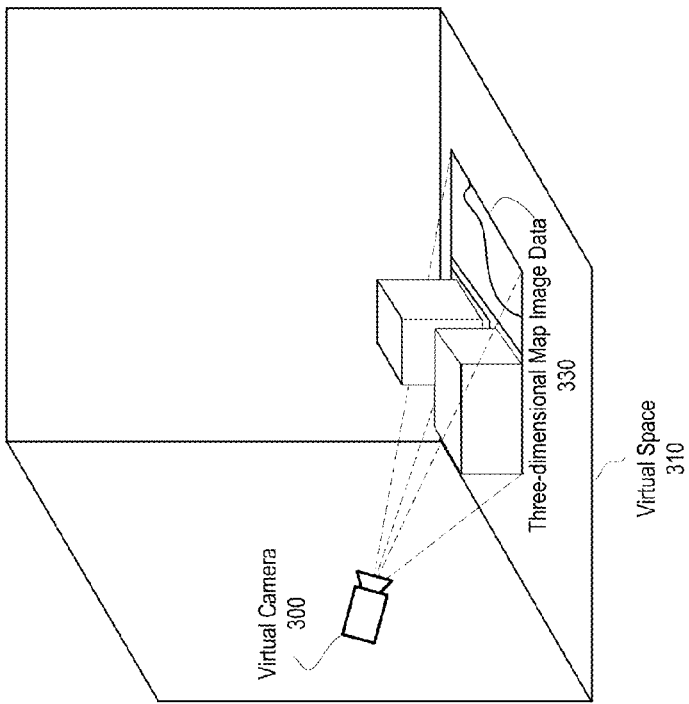
FIG. 3b illustrates a virtual camera in virtual space as it observes three-dimensional map image data, according to some embodiments.
Figure 3A:
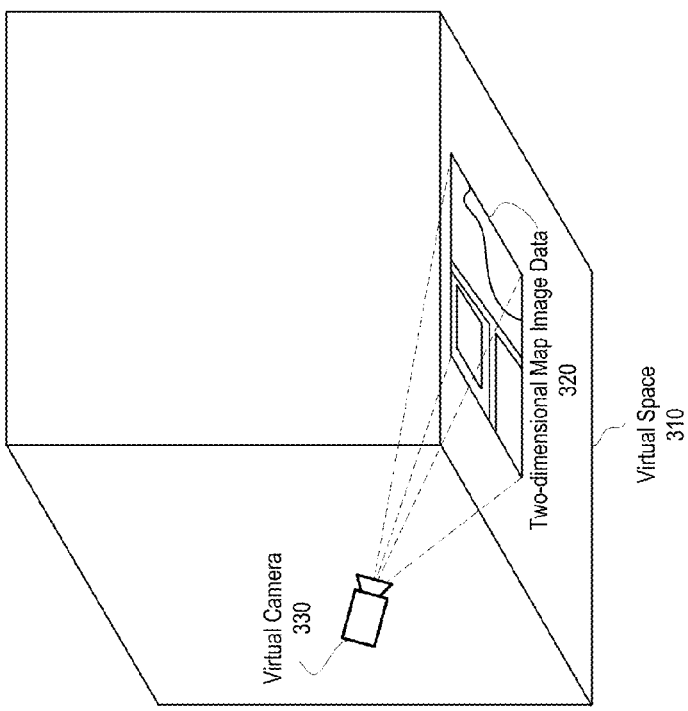
FIGS. 3a illustrates a virtual camera in virtual space as it observes two-dimensional map image data, according to some embodiments.

To render and display map image data, or more generally image data, a technique well-known to those of ordinary skill in the art uses a virtual camera. As discussed above, a virtual camera operates much like a physical camera. A virtual camera has a location or position within virtual space. From this position, a virtual camera may be oriented in a direction in order to observe image data. A virtual camera observes image data within a field-of-view, usually, but not limited to, a rectangular area. Like a physical camera, a virtual camera may change its position, adjust its orientation, or, in some embodiments, resize its field-of-view. The virtual space in which a virtual camera operates is a three-dimensional space. Two-dimensional or three-dimensional objects may be observed by a virtual camera in a virtual space. For example, FIG. 3A illustrates a virtual camera in virtual space as it observes two-dimensional map image data. Virtual camera 300 may change position in the virtual space 310 to observe the two-dimensional map image data 320. Likewise, FIG. 3B illustrates a virtual camera 300 in virtual space 310 as it observes three-dimensional map image data 330. Virtual camera 300 may again change position to observe the three-dimensional map image data 330 from another angle.

To selectively obtain map image data according to virtual camera velocity, embodiments may detect the velocity of the virtual camera 210. In some embodiments map image data may be displayed as a series of images to create the effect of a moving animation. As a virtual camera traverses a map, the virtual camera may observe map image data at various location points, so that a device may render and display the map image data determined at the various location points. At each of these location points, the virtual camera's velocity may be detected. Some embodiments may implement various methods, techniques or devices for manipulating the virtual camera to create virtual camera velocity, such as those described below with respect to FIGS. 4 through 5*c*. For example, some embodiments may allow touch input, such as gestures obtain via a touch-sensitive display 1012 in FIG. 10, to direct the movement of a virtual camera. Determining the velocity in such an embodiment may be implemented by analyzing the input data received. Embodiments may also implement other input devices, including, but not limited to, orientation sensors or joysticks, to manipulate the virtual camera. Embodiments may also implement techniques such as using a location component or location services or data to manipulate the virtual camera, such as described below with regard to FIG. 6*c*.

Embodiments may then determine a level-of-detail for the map image data for the map view of a map indicating a level-of-detail for the map image data where the level-of-detail is determined according to the velocity of the virtual camera 220. Some embodiments may indicate a level-of-detail according to numerous variables, including, but not limited to, map zoom level, map type, object/features in the map image data. These variables may then be linked to certain virtual camera velocities, or ranges of velocities of the virtual camera which are linked in turn to certain levels-of-detail, or ranges of levels-of-detail. To determine map image data indicating a level-of-detail, some embodiments may determine whether the detected velocity exceeds a velocity threshold. A velocity threshold is a velocity value or range of values to which embodiments may compare the detected velocity of a virtual camera. A discussed previously, there may be one or more velocity thresholds, which may be determined according to various factors, such as map image data type, for example raster graphics data or vector graphics data, virtual camera manipulation input type, such as touch, orientation sensor, or location component, or the map image data location within the larger virtual space relative to the virtual camera location. In response to determining that the detected velocity exceeds a velocity threshold, embodiments may specify a level-of-detail for the map image data. In some embodiments, the specified level of detail may be determined according to the distance from the virtual camera to the location of the map image data in virtual space. Other varying methods of specifying a level-of-detail for map image data including the above example, are discussed below with regard to FIGS. 6a and 6b. A specification for level of detail may be recorded or identified in a temporary or permanent data structure that assembles map image data information about the current map image data.

Embodiments may then obtain the determined map image data 230. Determined map image data may indicate a default level-of-detail. For example, a virtual camera may have a detected velocity of 5 which is then compared to a velocity threshold of 20. Because the velocity does not exceed the velocity threshold, a device may obtain the map image data from a map service and/or access map image data stored locally, retrieving the default level-of-detail indicated for the map image data. FIG. 7 provides a visual example of this possibility at elements 803 and 804. Obtaining map image data may occur by obtaining the map image data from a map service, such as map service 130 described above in FIG. 1, or any other server sending map image data to a client device. Obtaining map image data may also occur by accessing map image data stored locally, such as in memory 1002 in FIG. 8.

After obtaining the determined map image data, some embodiments may then render the observed map image data. Many rendering devices and techniques are well-known to those of ordinary skill in the art. The obtained map image data may be encoded utilizing the various image data formats, discussed above. Map image data may be a combination of data formats and types, such as raster image data, vector image data, or a combination of both. Common techniques to render various types of map image data such as, but not limited to, may include utilizing the Open Graphics Library (OpenGL) or Direct3D application programmer interfaces, or variants thereof such as OpenGL ES. Customized rendering applications which may optimize the performance of CPUs or GPUs may also be implemented. Rendering raster data may be implemented by decoding or decompressing, raster data according to its format and, if displaying the raster data, submitting the raster data to a hardware device, such as a frame buffer, which displays the raster data. Vector image data may be rendered implementing many well-known rendering pipelines that transform the vector primitives into a raster image, which may be submitted to a hardware device, such as a frame buffer. Other software structures and devices may be used store pre-rendered and rendered data, combining one or more types of image data in a single image. Many other software and hardware implementations may be used to render the observed map image data. In some embodiments the rendered map image data may be displayed on the rendering device. Embodiments may also store the rendered map image data or send the map image data to other modules or applications for further processing.

FIGS. 4a and 4b illustrate an example display of map data selectively obtained according to virtual camera velocity. Portable multi-function device 400, as described below with respect to FIGS. 9 through 12, displays a map view of the same map area in FIG. 4a and FIG. 4b. In FIG. 4a, the virtual camera velocity has exceed the given threshold, so lower level detail is obtained. River feature 404 and park feature 402 have simple shading patterns to fill their space. In FIG. 4b, the virtual camera is at zero velocity, or still, so full detail map data is obtained. Park feature 406 has trees and shrubs in the displayed texture and river feature 408 has a wave texture. Many different examples of low and high level detail, as well as areas where such detail may be displayed may be implemented. The above figures are not intended to be limiting.

Various embodiments may determine whether all of the determined map image data for the map view of the map according to the velocity of the virtual camera is obtained. For example, a map application may implement a download tracker. This download tracker identifies what map image data is sought, from what source the map image data is sought, the indicated level-of-detail for the map image data, and whether it has been received. Such a download tracker may determine whether all of the determined map image data is obtained by examining whether the map image data has been received. In response to determining that all of the determined map image data is obtained, embodiments may determine the map image data for the map view and obtain the determined map image data. Continuing the above example, the download tracker may instruct another component within a map application to obtain, without reference to a level-of-detail, the sought map image data. The above example is one of many possible implementations of determining whether the determined map image data is obtained, and is not intended to be limiting. Many other hardware implementations, such as through download or display buffers, software implementations, such as through various data structures, and/or combination of thereof may be envisioned.

Detecting Virtual Camera Velocity

To determine map image data indicating a level-of-detail where the level-of-detail is determined according to the velocity of the virtual camera, as indicated at 220 in FIG. 2, the virtual camera velocity must be determined, as indicated at 210. Detecting a virtual camera's velocity, in some embodiments may involve analyzing the movement between positions in virtual space and/or the input of various devices. In many embodiments, detecting the velocity of the may be implemented by analyzing the movement of the virtual camera itself without regard to the instigation of the movement of the virtual camera. As velocity is generally considered to be the distance between two points, divided by the amount of time taken to travel between the two points, a simple calculation may provide the velocity of the virtual camera. However, in some embodiments velocity may be more broadly construed to encompass the rotation of a virtual camera about a fixed position in virtual space.

Figure 5:
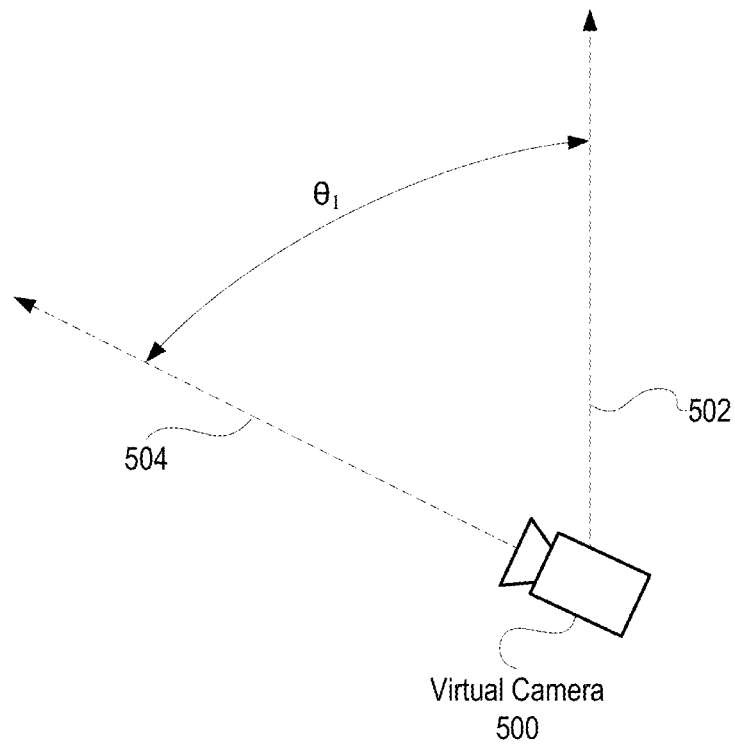
FIG. 5 illustrates the rotation of a virtual camera about a fixed position and may illuminate how some embodiments detect virtual camera velocity, according to some embodiments.

FIG. 5 illustrates the rotation of a virtual camera about a fixed position and may illuminate how some embodiments detect virtual camera velocity. Virtual camera 500 is positioned at fixed point in virtual space. Virtual camera 500 may begin by orienting its field of view in the direction 502. The virtual camera 500 may then rotate a certain distance according to the angle $\theta_1$ till it faces the direction 504. Some embodiments may determine a velocity by calculating the distance between the two directions, 502 and 504, according to the angle $\theta_1$, and the time to turn between direction 502 and 504. Note the distance between the two directions expands according to the degree of the angle, $\theta_1$. Therefore, in some embodiments determining the velocity of a virtual camera rotating on or about a fixed point, multiple velocity determinations may be detected for different portions of the map image data according to their relative distance from the virtual camera.

Figure 6A:
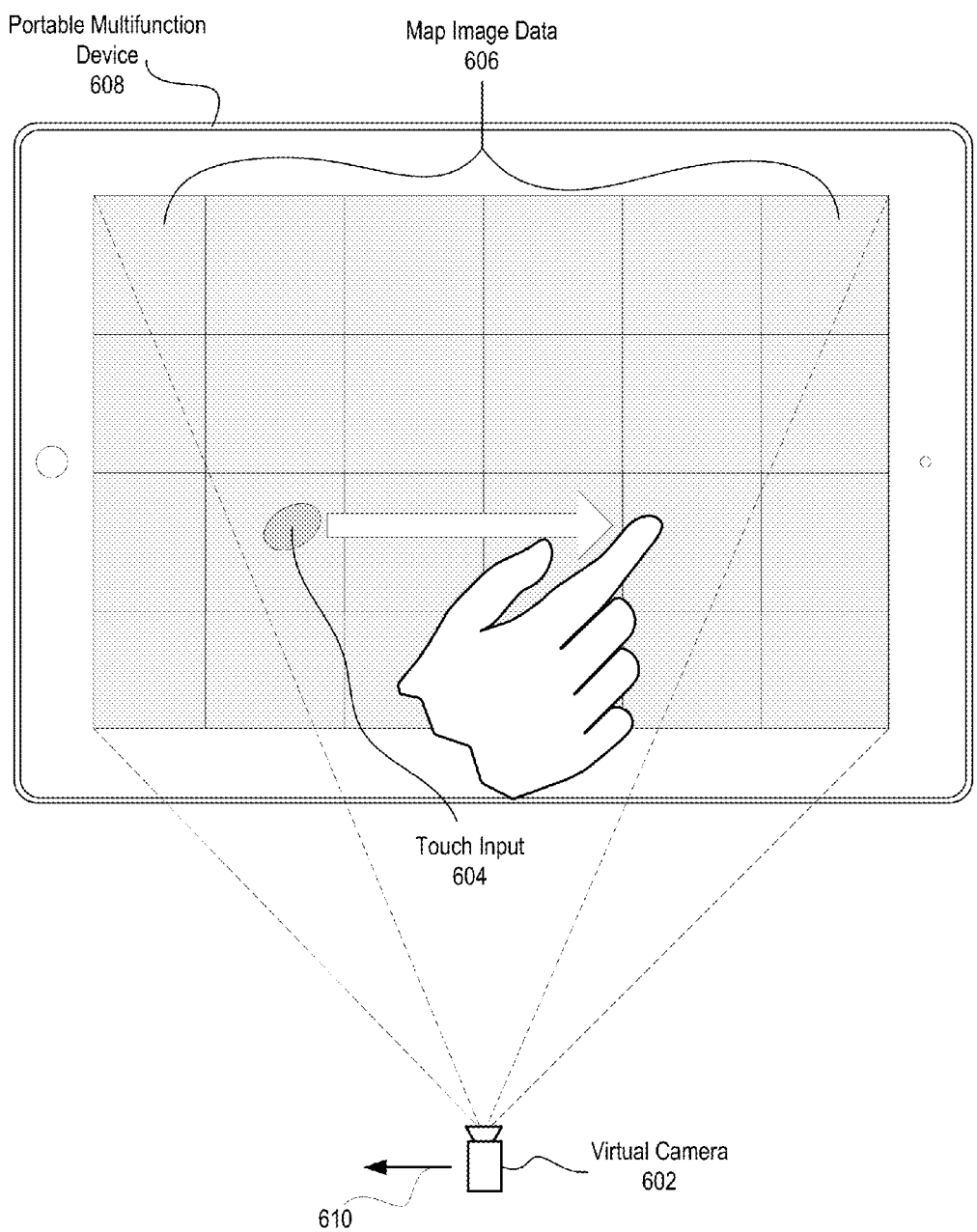
FIG. 6a illustrates an example of touch input to a touch-sensitive input device and its effect upon the movement of a virtual camera, according to some embodiments.
Figure 11:
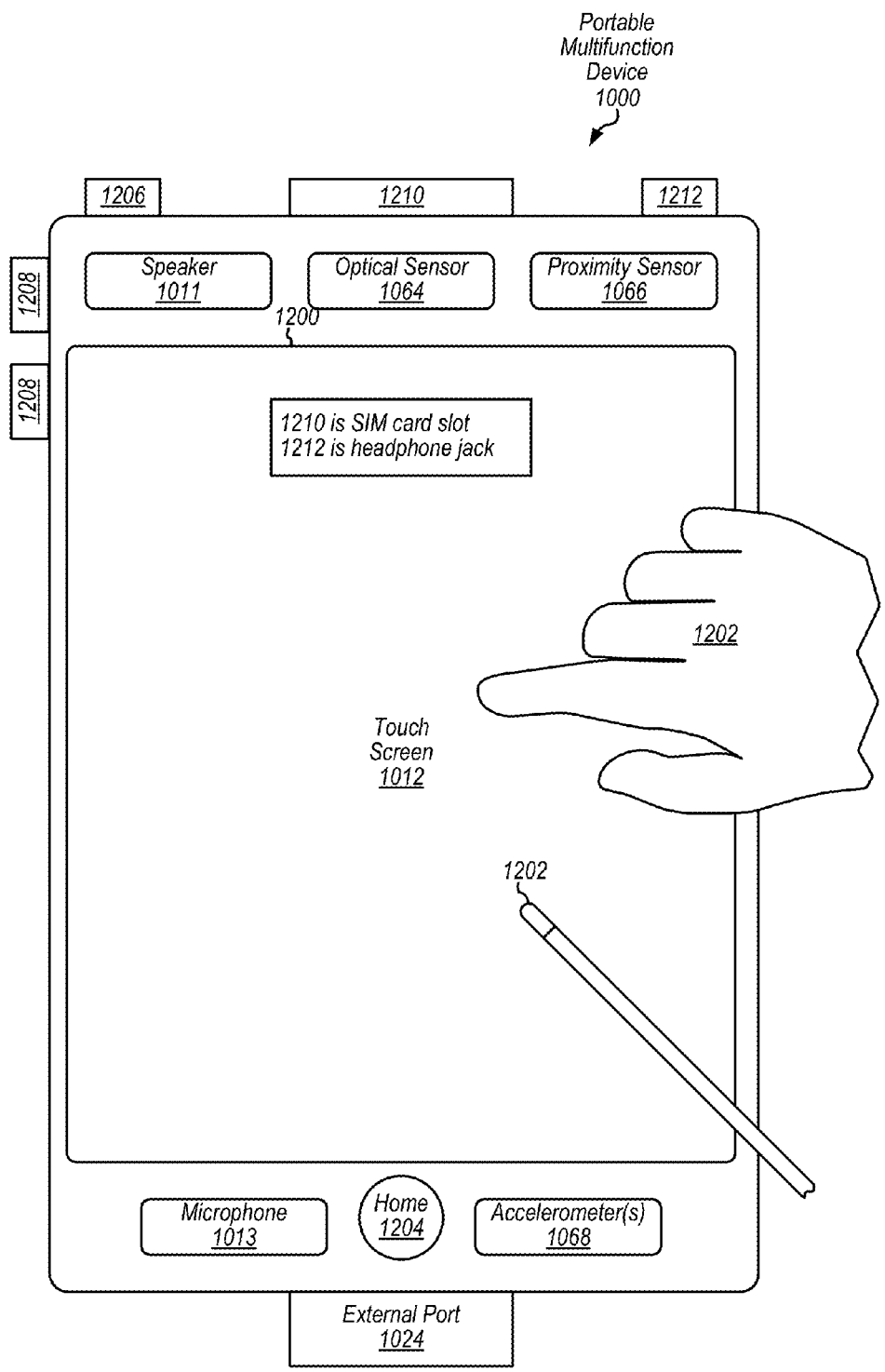
FIG. 11 illustrates an example electronic device, according to some embodiments.
Figure 12:
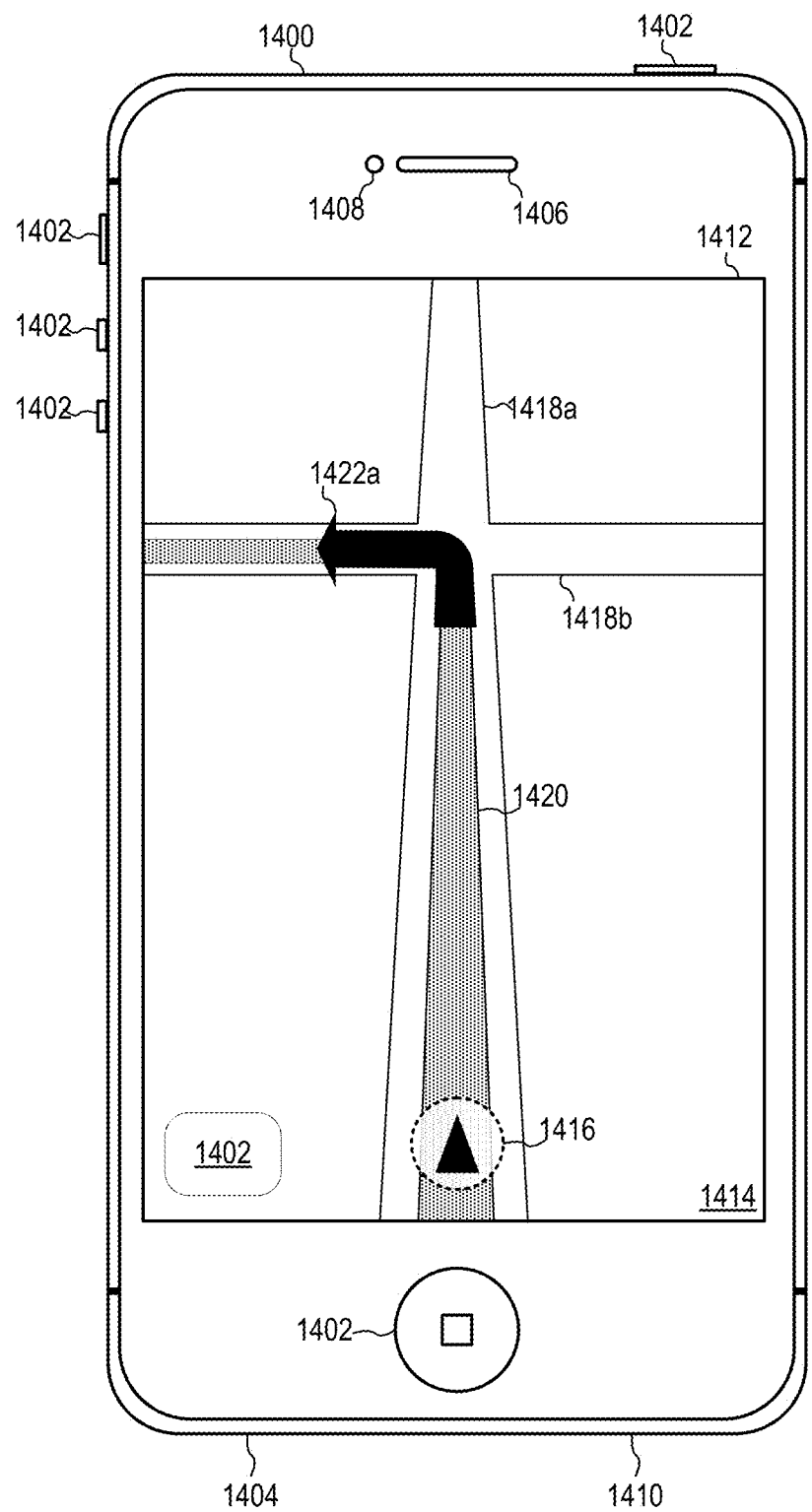
FIG. 12 illustrates an example electronic device, according to some embodiments.

In at least some embodiments, a virtual camera may be manipulated according to input from a touch-sensitive input device, such as touch-sensitive display 1012 in FIG. 11. FIG. 6a illustrates an example of touch input to a touch-sensitive input device and its effect upon the movement of a virtual camera. Virtual camera 602 is observing map image data 606 on a portable multifunction device 608. A user may provide touch input 604, which is illustrated as a swipe gesture to the right of the device. In turn, the virtual camera 602 may move in direction 610, observing new map image data along the way. A device may analyze the swipe gesture, for example the length of it and the time from beginning to end of it, to determine the velocity of the virtual camera 602 in manipulation direction 610. Some embodiments may measure the effect of the input on the virtual camera, essentially measuring the distance between the starting point and current point of the virtual camera and the time the virtual camera took to travel between the two points.

Figure 6B:
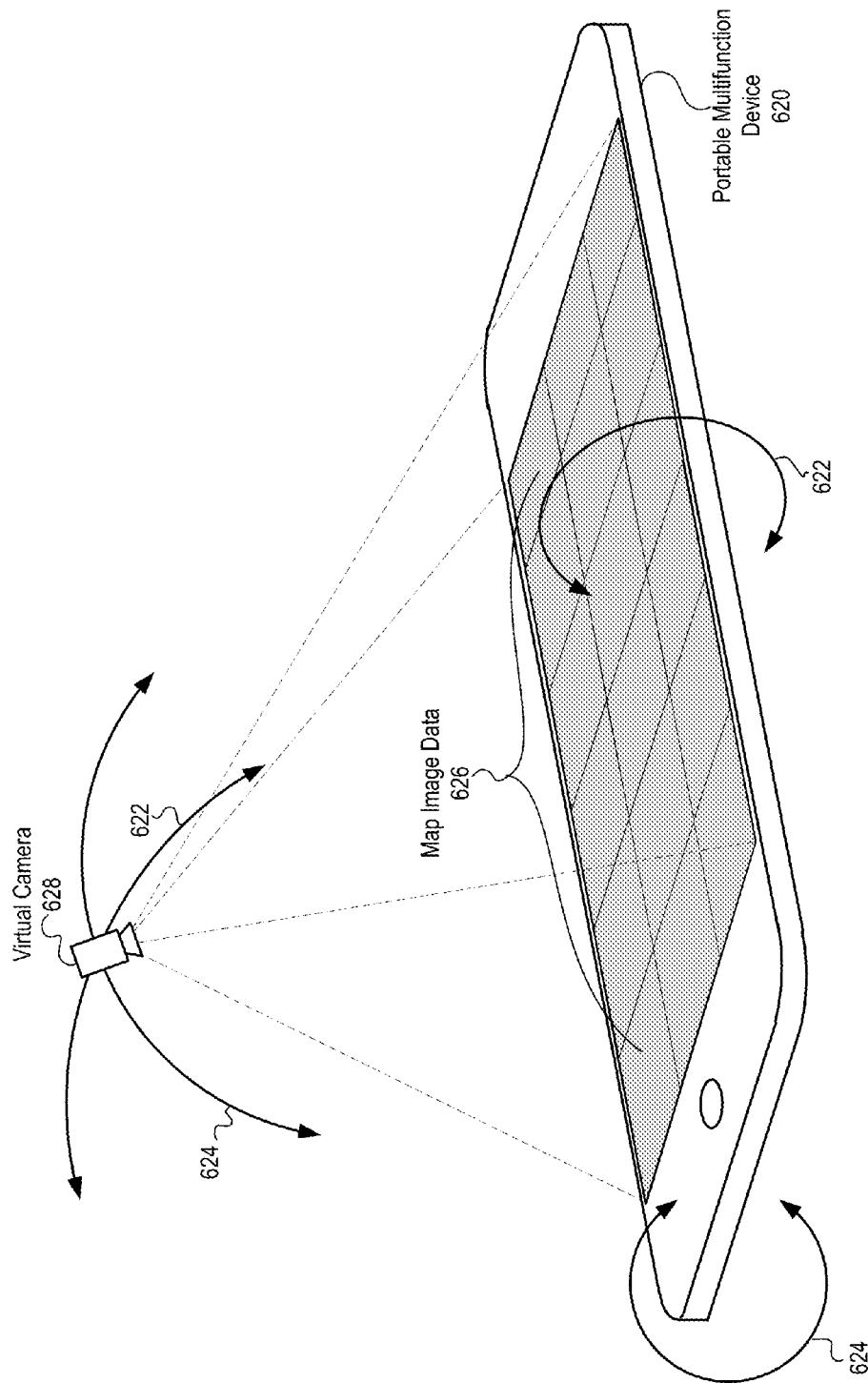
FIG. 6b illustrates an example of orientation sensor input and its effect upon the movement of a virtual camera, according to some embodiments.
Figure 9:
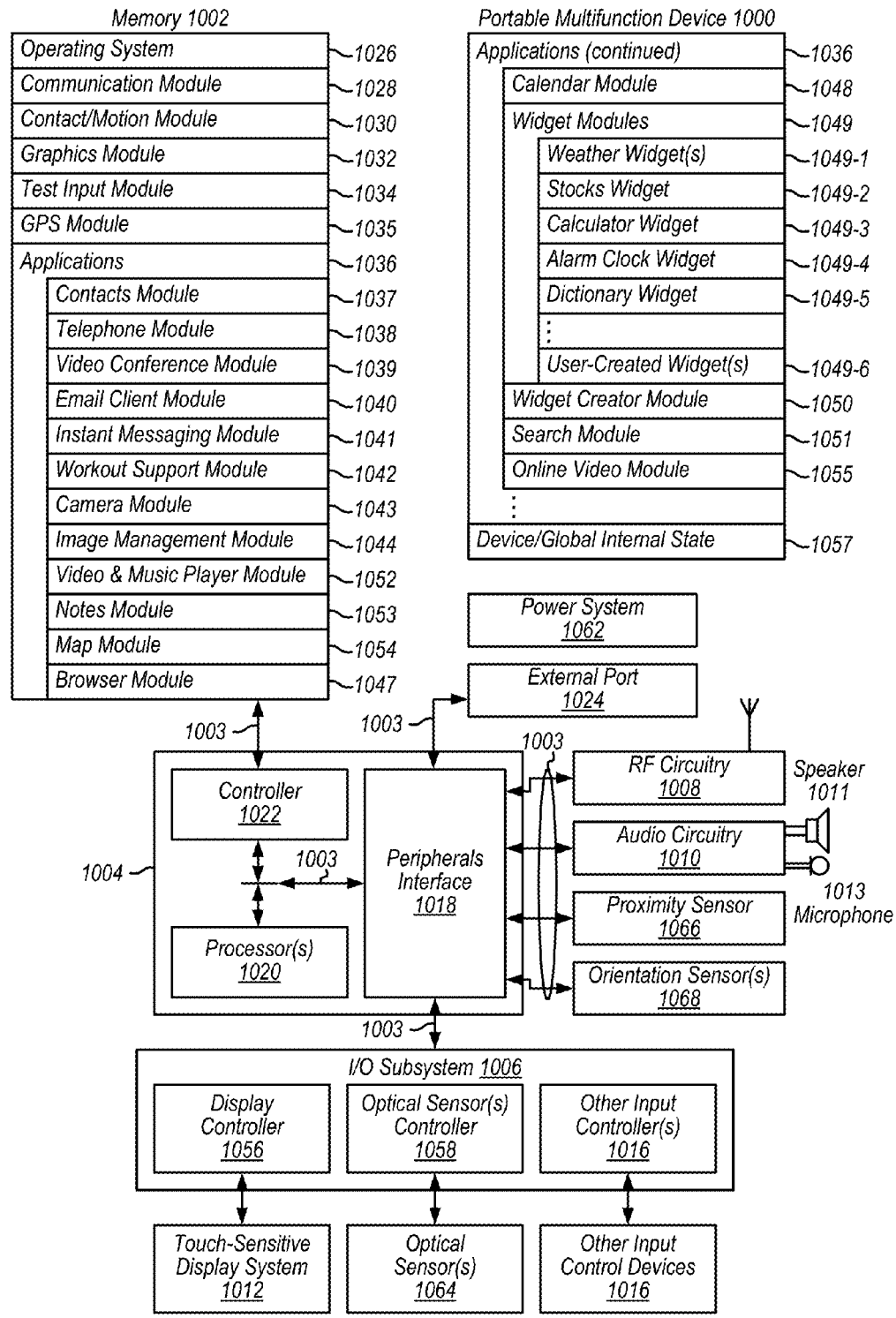
FIG. 9 illustrates an example electronic device, according to some embodiments.
Figure 10:
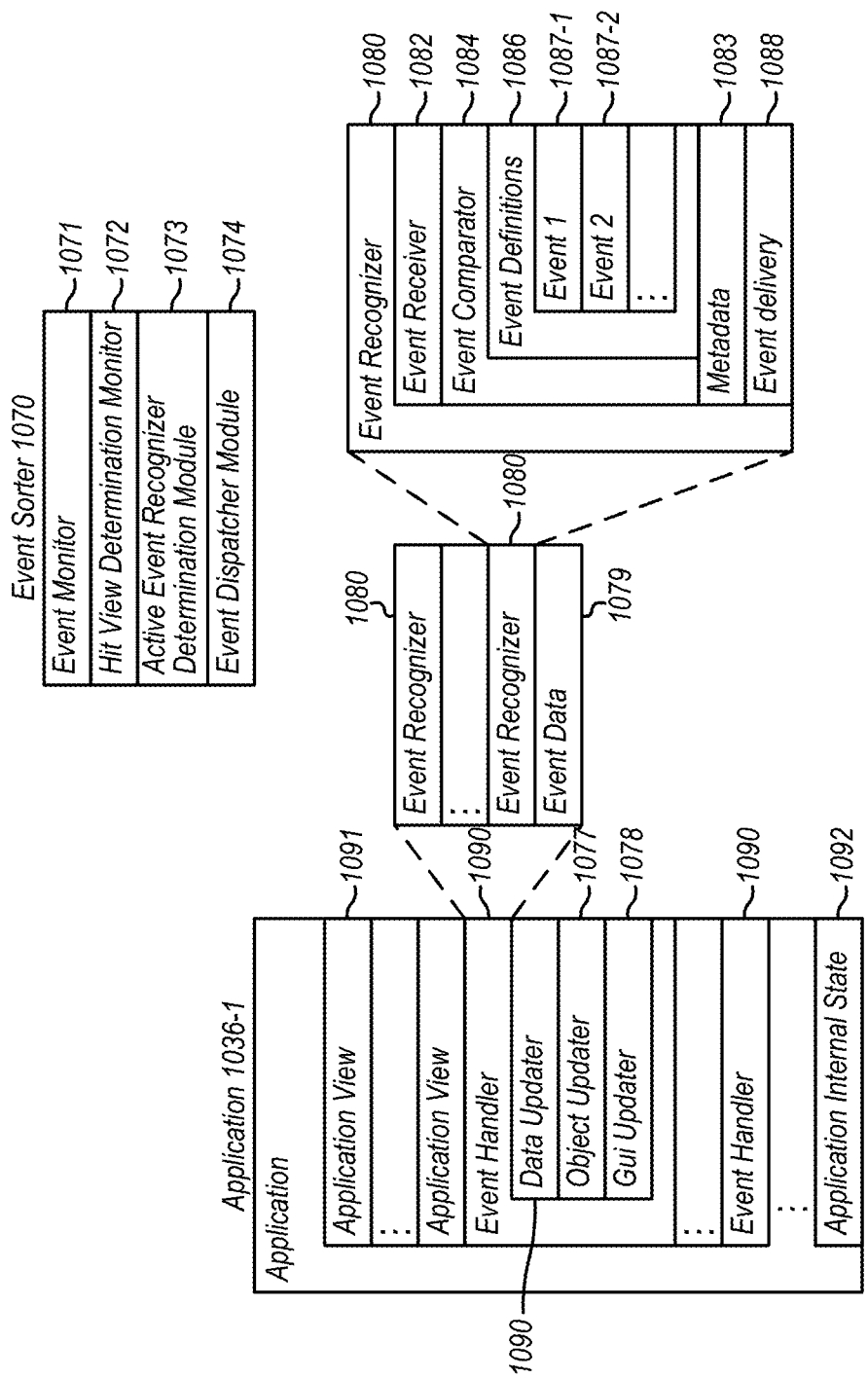
FIG. 10 illustrates an example electronic device, according to some embodiments.

In at least some embodiments, a virtual camera may be manipulated according to input from orientation sensors, such as orientation sensors 1068 described with regard to FIG. 9. FIG. 6*b* illustrates an example of orientation sensor input and its effect upon the movement of a virtual camera. Virtual camera 628 observes map image data 626 on portable multifunction device 620. Orientation sensors may detect a change in a device's orientation, such as a direction tilting forward 622 or tilting side-to-side 624. A user may tilt the portable multifunction device 620 forward 622, and in turn the virtual camera 628 may move along the corresponding direction 622, observing new map image data along the way. Likewise a user may tilt the portable multifunction device 620 to one side 624 and the virtual camera 628 may move along the corresponding direction 622, observing new map image data along the way. A device may analyze the tilting motion, for example by determining the angle between to positions and the time from beginning to end of the motion, to determine the velocity of virtual camera 628.

Figure 6C:
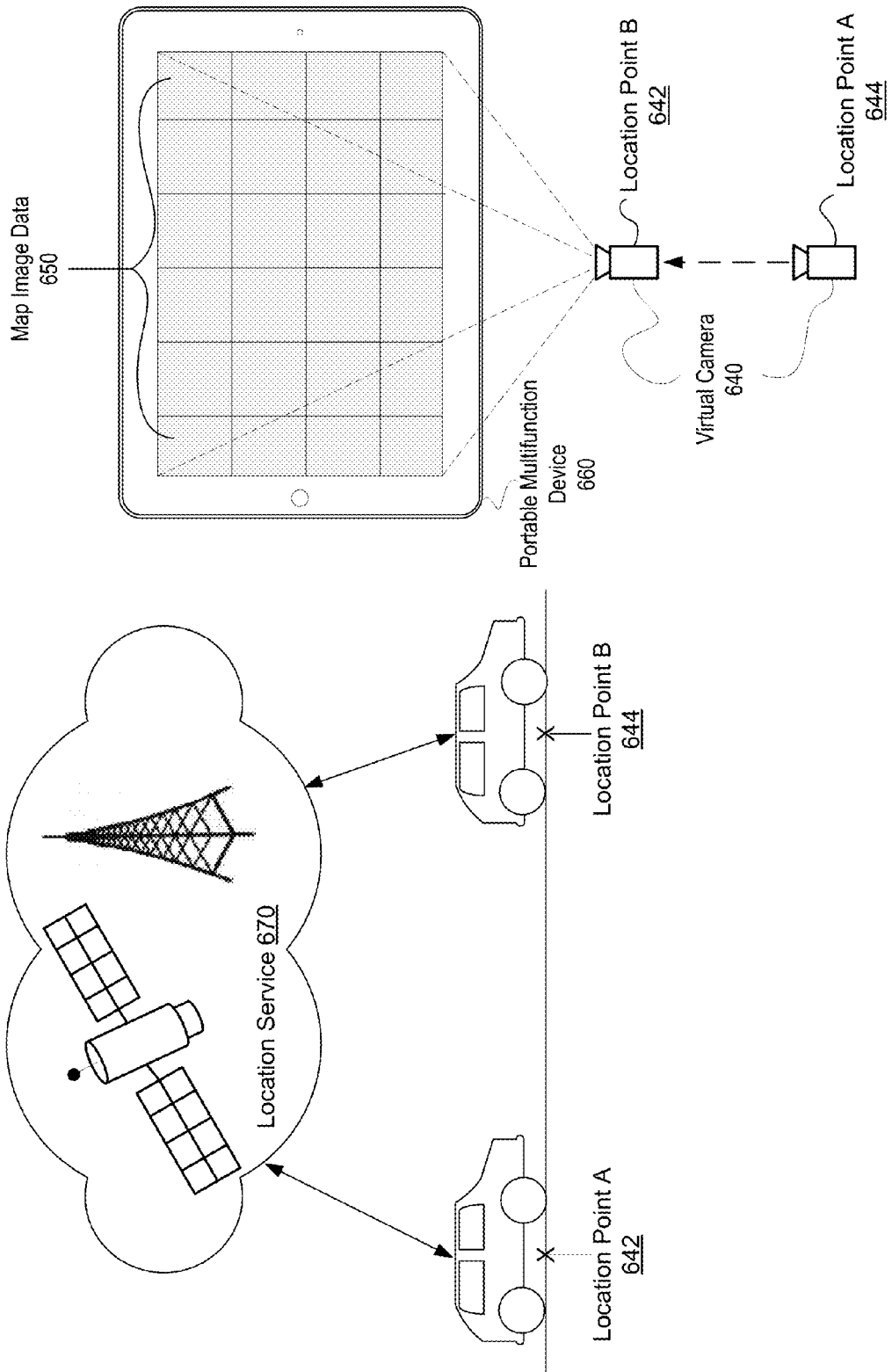
FIG. 6c illustrates an example of location data and its effect upon the movement of a virtual camera, according to some embodiments.

In at least some embodiments, a virtual camera may be manipulated according to location data obtained from a location component or location service. FIG. 6*c* illustrates an example of location data and its effect upon the movement of a virtual camera. Location data may be obtained by a device that is changing geographic location. A device, for example, may be moved by a pedestrian, a motor vehicle, a bicycle, or another method of movement or transportation. Location point A 642 represents a portable multifunction device 660 moving in an automobile at point A. Location point B 644 represents the same device 660 moving in an automobile at point B. At both points, a device may communicate with a location service 670, relying on such technologies, including but not limited to, GPS, A-GPS, location by Internet Protocol (IP) connections, or WiFi connection locations, to retrieve a physical location of the device at each point 642 and 644. These changes in location may be utilized by a virtual camera 660 observing map image data 650 on portable multifunction device 660. The device 660 may locate the virtual camera's 640 position in virtual space relative to the detected locations in physical space. The device 660 may move the virtual camera from location point A 642 to location point B 644 relative to the distance and direction moved between location point A 642 and location point B 644. A device may analyze the distance and time traveled between the two location points in virtual space to determine the velocity of virtual camera 640.

The previous examples and illustrations are examples of many possible implementations of detecting virtual camera velocity and are not intended to be limiting. Any manipulation or movement in a virtual space, whether by internal or external input, may be able to determine the virtual camera's velocity according to well-known velocity equations. Persons having ordinary skill in the art will recognize the many different configurations of hardware and software capable of making a velocity determination for a virtual camera.

Indicating Map Image Data Level-of-Detail

In various embodiments a device may detect a virtual camera's velocity, such as through the techniques discussed above with regard to FIGS. 5 through 6*c*. Various embodiments may determine map image data for the map view of the map indicating level-of-detail for the map image detail according to the velocity of the virtual camera, as indicated at 220 in FIG. 2. Some embodiments may indicate a level-of-detail according to numerous variables, including, but not limited to, map zoom level, map type, object/features in the map image data. These variables may then be linked to certain virtual camera velocities, or ranges of velocities of the virtual camera which are linked in turn to certain levels-of-detail, or ranges of levels-of-detail. For example, when the velocity of a virtual camera is detected, a device may access a level-of-detail index for the given map at a certain zoom level which indicates a particular level-of-detail according to the detected zoom level. Some embodiments may determine whether the detected velocity exceeds a velocity threshold. In response to such a determination of velocity that exceeds a velocity threshold, embodiments may specify a level-of-detail for the map image data. Various levels-of-detail may be specified for map image data, and multiple levels-of-detail may be obtained, processed, transmitted, rendered, or displayed. A level-of-detail may be the map image data size, resolution, complexity, or other factor that increases the rendering time of the map image data. For example, map image data containing a coast line, may at high levels-of-detail be described using raster graphics data. However, at a certain level-of-detail and below, the lake may be described more simply using vector graphics data. There are many different techniques of implementing multiple level-of-details for map image data well-known to those of ordinary skill in the art. Another example, such as mipmaps, may provide various levels-of-detail for map image data in various embodiments.

Embodiments may implement rendering map image data with high and low level-of-detail. The terms high and low do not necessarily indicate or specify a single level-of-detail, such as a single resolution, but may connote a range of lower level-of-detail or higher level-of-detail as implemented in a particular set of map image data. For example, a map composed of map image data may have eight levels of resolution. The first five levels may be considered low level-of-detail, while the remaining three are considered high level-of-detail. A device may indicate or specify any one of the first five, low level-of-details according to a virtual cameras velocity. A device may take into account numerous factors to make a determination within a range of low or high level-of-details, including but not limited to the surrounding image data level-of-detail, the current rendering capability of the device, or communication capability with a map service, such as described in FIG. 1. Any particular specification within a range for both low and high is encompassed in the various embodiments presented, as well as those implementations where just two specific image data levels-of-detail are available. High and low level-of-detail may also be determined relative to a default or standard level-of-detail for map image data. Level-of-detail may be lowered or increased in varying degrees, such as by one level at a time or skipping various levels when raising or lowering.

Figure 7B:
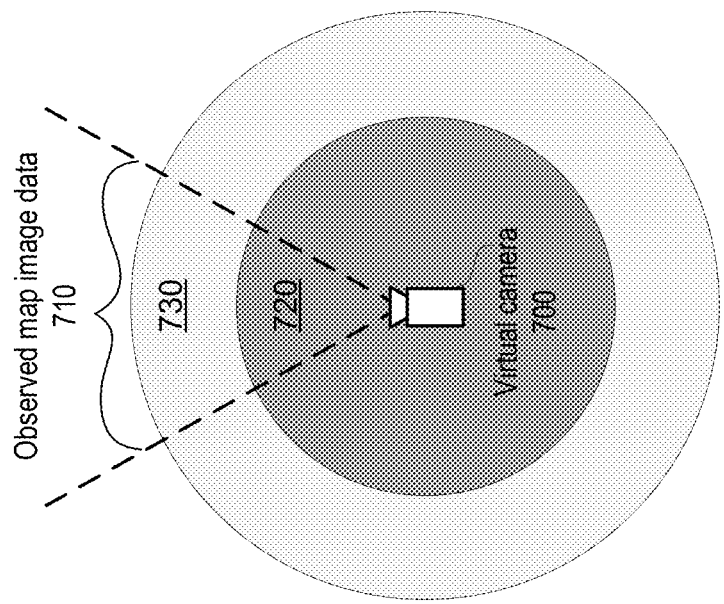
FIGS. 7a and 7b illustrate differing levels of relative distance in virtual space from a virtual camera with varying level-of-detail specified, according to some embodiments.
Figure 7A:
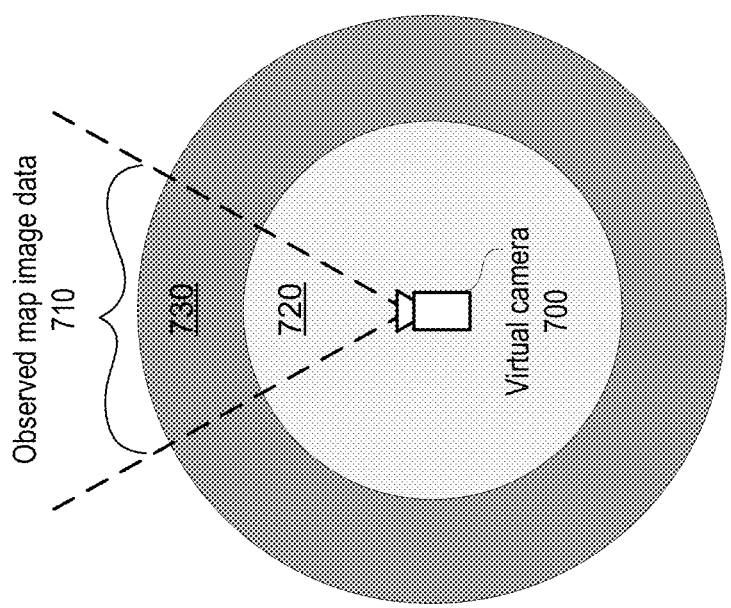

Some embodiments may select the level-of-detail for the map image data according to a distance from the virtual camera to a location of the map image data in a virtual space. For example, FIGS. 7*a* and 7*b* illustrate differing levels of relative distance in virtual space from a virtual camera with varying levels-of-detail specified for map image data within the distance range. In FIG. 7*a*, virtual camera 700, observes map image data 710 according to a field of view. Image data relatively close in distance 720 to the virtual camera 700 is specified to a low level-of-detail. Whereas, the image data relatively far in distance 730 from the virtual camera 700 is specified with a high level-of-detail. FIG. 7*b* represents an opposite scenario. Virtual camera 700, observes map image data 710 according to a field of view. Image data relatively close in distance 720 to the virtual camera 700 is specified to a high level-of-detail. Whereas, the image data relatively far in distance 730 from the virtual camera 700 is specified with a low level-of-detail.

The above examples are two of many possible implementations of selectively obtaining map image data according to virtual camera velocity and are not intended to be limiting. For example both examples may be implemented as two of many different scenarios on a device which may be selected according to various factors, for example map image type. FIG. 7*a*, for example, may be suited to map image data that is implementing a navigation system, such as turn by turn map image display, such as displayed in FIG. 12. As the data that is closest to a viewer is moving by very quickly, it need not be viewed a high level-of-detail. Meanwhile, map image data on the horizon or far distance, may appear relatively the same, and therefore be rendered at a high level-of-detail. FIG. 7*b*, in another example, may best be utilized in the scenario where a viewer of map image data is rotating their view in a fixed position. The map image data close to the viewer will appear to be moving slower, and subject to higher viewer scrutiny. Thus, map image data relatively close to the viewer will be rendered in high level-of-detail, while the map image data relatively far from the viewer will be rendered in low level-of-detail. Other embodiments may be displaying an aerial view of a map. For this type of embodiment, any virtual camera motion at all may lessen the viewable quality of an image by a viewer, so the same level-of-detail may be specified for the map image data.

Indicating a level-of-detail for obtaining map image data may be implemented when obtaining the determined map image data, indicated at 230 in FIG. 2, by formatting request messages to a map service, such as map service 130 described with regard to FIG. 1, in some embodiments. These requests may specify a specific level-of-detail, or request a high or low level-of-detail, from which the map service may determine the particular map image data with the specified level-of-detail to retrieve. Embodiments may also implement certain local data structures and/or storage buffers or devices to store multiple level-of-details of map image data, such as in memory 1002 in FIG. 9. Such data structures or devices may be located internal or external to any graphics or rendering pipelines or hardware devices, such as GPUs and/or CPUs. Various forms of hardware logic or software implementation may determine a specific map image data level-of-detail within a range of high or low level-of-details.

Example Embodiments

Various embodiments may implement selectively obtaining map image data according to virtual camera velocity. In some embodiments, a map module, application, component or navigation component may be implemented to selectively obtain map image data according to virtual camera velocity. For example, an electronic navigation device may implement a navigation component according to the various methods and techniques described with regard to FIGS. 2 through 7*b*. In another example, a portable multi-function device, such as described below with respect to FIGS. 9 through 12, may implement a map application according to the various methods and techniques described with regard to FIGS. 2 through 7*b*. FIG. 8 illustrates a map module (or component, application, or navigation component), according to some embodiments. The map module may be implemented on an electronic or computing device, such as a portable multifunction device described below with respect to FIGS. 9 through 12, or on a system such as described below with respect to FIG. 13.

The map module 800 may first determine the map image data observed by a virtual camera 801. For example, a device implementing the module may be rendering and/or displaying a three-dimensional street map from an aerial perspective, which a virtual camera may observe. Various forms of input, external and internal to the map rendering module may manipulate the position and/or orientation of the virtual camera. A location service (or location component) 810, such as one implemented by A-GPS, may provide location data to a map rendering module 800, which in turn moves the virtual camera observing the map image data in virtual space. Likewise, touch input 820, such as a gesture, tap, or multiple touch, may also move the virtual camera observing the map image data in virtual space. Orientation sensors 830 may provide additional input to move the virtual camera observing the map image data in virtual space. The map rendering module 800 may analyze directly the input of location service 810, touch input 820, or orientation sensors 830, or analyze the effect of the input on the virtual camera in order to detect the velocity of the virtual camera 802.

As indicated at 803, the map rendering module 800 may determine whether the detected velocity exceeds a velocity threshold 803. This velocity threshold may be a single value, or a range of values depending on the relative location of the map image data in virtual space, the position or movement of the virtual camera (e.g., a rotation versus a change in position in virtual space), or a particular mode of the device implementing the map rendering module 800 (e.g., navigation mode, map display mode, directions, etc.).

If the velocity threshold is exceeded, a map rendering module 800 may then specify the map image data level-of-detail 804. This specification may occur according to the determination of whether the detected velocity exceeds the velocity threshold. Then (or if the detected velocity did not exceed the velocity threshold), a map rendering module 800, may request map image data corresponding to the specified level-of-detail 805 from a map service 840, such as map service 130 described in FIG. 1. This request may be formatted relying on various well-known messaging structures and schemes using the various communication channels described with regard to FIG. 1 and client devices 102. A map service 840, may operate within the context of a map service operating environment, such as illustrated in FIG. 1. The map service may determine the map image data requested by the map rendering module 800 and return the map image data at the specified level-of-detail. A map rendering module may then load map image data corresponding to the specified level-of-detail 806 from map storage 850, such as memory 1002 in FIG. 9, which may be situated locally on an implementing device.

After requesting map image data 805 and loading map image data 806, a map rendering module 800 may render the map image data 807. A map rendering module 800 may then submit the rendered map image data to a display 860, such as touch-sensitive display 1012 in FIG. 11, to a storage medium 870, such as internal or external memory, and/or to other modules 880, such as other applications that may further process or append data to the rendered map information.

Example Electronic Device

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 9 is a block diagram illustrating portable multifunction device 1000 with touch-sensitive displays 1012 in accordance with some embodiments. Touch-sensitive display 1012 is sometimes called a "touch screen" for convenience, and may also be known as or called a touch-sensitive display system. Device 1000 may include memory 1002 (which may include one or more computer readable storage mediums), memory controller 1022, one or more processing units (CPU's) 1020, peripherals interface 1018, RF circuitry 1008, audio circuitry 1010, speaker 1011, microphone 1013, input/output (I/O) subsystem 1006, other input or control devices 1016, and external port 1024. Device 1000 may include one or more optical sensors 1064. These components may communicate over one or more communication buses or signal lines 1003.

It should be appreciated that device 1000 is only one example of a portable multifunction device, and that device 1000 may have more or fewer components than shown, may combine two or more components, or may have a different configuration or arrangement of the components. The various components shown in FIG. 9 may be implemented in hardware, software, or a combination of both hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1010, speaker 1011, and microphone 1013 provide an audio interface between a user and device 1000. Audio circuitry 1010 receives audio data from peripherals interface 1018, converts the audio data to an electrical signal, and transmits the electrical signal to speaker 1011. Speaker 1011 converts the electrical signal to human-audible sound waves. Audio circuitry 1010 also receives electrical signals converted by microphone 1013 from sound waves. Audio circuitry 1010 converts the electrical signal to audio data and transmits the audio data to peripherals interface 1018 for processing. Audio data may be retrieved from and/or transmitted to memory 1002 and/or RF circuitry 1008 by peripherals interface 1018. In some embodiments, audio circuitry 1010 also includes a headset jack (e.g., 1212, FIG. 11). The headset jack provides an interface between audio circuitry 1010 and removable audio input/output peripherals, such as output-only headphones or a headset with both output (e.g., a headphone for one or both ears) and input (e.g., a microphone).

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input or control devices. The one or more input controllers 1060 receive/send electrical signals from/to other input or control devices 1016. The other input control devices 1016 may include physical buttons (e.g., push buttons, rocker buttons, etc.), dials, slider switches, joysticks, click wheels, and so forth. In some alternate embodiments, input controller(s) 1060 may be coupled to any (or none) of the following: a keyboard, infrared port, USB port, and a pointer device such as a mouse. The one or more buttons (e.g., 1208, FIG. 11) may include an up/down button for volume control of speaker 1011 and/or microphone 1013. The one or more buttons may include a push button (e.g., 1206, FIG. 11).

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 has a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an exemplary embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 1012. In an exemplary embodiment, projected mutual capacitance sensing technology is used, such as that found in the iPhone®, iPod Touch®, and iPad® from Apple Inc. of Cupertino, Calif.

Touch screen 1012 may have a video resolution in excess of 100 dpi. In some embodiments, the touch screen has a video resolution of approximately 1060 dpi. The user may make contact with touch screen 1012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1012 or an extension of the touch-sensitive surface formed by the touch screen.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors 1064. FIG. 9 shows an optical sensor coupled to optical sensor controller 1058 in I/O subsystem 1006. Optical sensor 1064 may include charge-coupled device (CCD) or complementary metal-oxide semiconductor (CMOS) phototransistors. Optical sensor 1064 receives light from the environment, projected through one or more lens, and converts the light to data representing an image. In conjunction with imaging module 1043 (also called a camera module), optical sensor 1064 may capture still images or video. In some embodiments, an optical sensor is located on the back of device 1000, opposite touch screen display 1012 on the front of the device, so that the touch screen display may be used as a viewfinder for still and/or video image acquisition. In some embodiments, another optical sensor is located on the front of the device so that the user's image may be obtained for video-conferencing while the user views the other video conference participants on the touch screen display.

Device 1000 may also include one or more proximity sensors 1066. FIG. 9 shows proximity sensor 1066 coupled to peripherals interface 1018. Alternately, proximity sensor 1066 may be coupled to input controller 1060 in I/O subsystem 1006. In some embodiments, the proximity sensor turns off and disables touch screen 1012 when the multifunction device is placed near the user's ear (e.g., when the user is making a phone call).

Device 1000 includes one or more orientation sensors 1068. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors include any combination of orientation/rotation sensors. FIG. 9 shows the one or more orientation sensors 1068 coupled to peripherals interface 1018. Alternately, the one or more orientation sensors 1068 may be coupled to an input controller 1060 in I/O subsystem 1006. In some embodiments, information is displayed on the touch screen display in a portrait view or a landscape view based on an analysis of data received from the one or more orientation sensors.

In some embodiments, the software components stored in memory 1002 include operating system 1026, communication module (or set of instructions) 1028, contact/motion module (or set of instructions) 1030, graphics module (or set of instructions) 1032, text input module (or set of instructions) 1034, Global Positioning System (GPS) module (or set of instructions) 1035, and applications (or sets of instructions) 1036. Furthermore, in some embodiments memory 1002 stores device/global internal state 1057, as shown in FIG. 9. Device/global internal state 1057 includes one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1028 facilitates communication with other devices over one or more external ports 1024 and also includes various software components for handling data received by RF circuitry 1008 and/or external port 1024. External port 1024 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 1030 may detect contact with touch screen 1012 (in conjunction with display controller 1056) and other touch sensitive devices (e.g., a touchpad or physical click wheel). Contact/motion module 1030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1030 and display controller 1056 detect contact on a touchpad.

Contact/motion module 1030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1032 includes various known software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1032 stores data representing graphics to be used. Each graphic may be assigned a corresponding code. Graphics module 1032 receives, from applications etc., one or more codes specifying graphics to be displayed along with, if necessary, coordinate data and other graphic property data, and then generates screen image data to output to display controller 1056.

Text input module 1034, which may be a component of graphics module 1032, provides soft keyboards for entering text in various applications (e.g., contacts 1037, e-mail 1040, IM 1041, browser 1047, and any other application that needs text input).

GPS module 1035 determines the location of the device and provides this information for use in various applications (e.g., to telephone 1038 for use in location-based dialing, to camera 1043 as picture/video metadata, and to applications that provide location-based services such as weather widgets, local yellow page widgets, and map/navigation widgets).

Applications 1036 may include the following modules (or sets of instructions), or a subset or superset thereof:
- contacts module 1037 (sometimes called an address book or contact list);
- telephone module 1038;
- video conferencing module 1039;
- e-mail client module 1040;
- instant messaging (IM) module 1041;
- workout support module 1042;
- camera module 1043 for still and/or video images;
- image management module 1044;
- browser module 1047;
- calendar module 1048;
- widget modules 1049, which may include one or more of: weather widget 1049-1, stocks widget 1049-2, calculator widget 1049-3, alarm clock widget 1049-4, dictionary widget 1049-5, and other widgets obtained by the user, as well as user-created widgets 1049-6;
- widget creator module 1050 for making user-created widgets 1049-6;
- search module 1051;
- video and music player module 1052, which may be made up of a video player module and a music player module;
- notes module 1053;
- map module 1054; and/or
- online video module 1055.

Examples of other applications 1036 that may be stored in memory 1002 include other word processing applications, other image editing applications, drawing applications, presentation applications, JAVA-enabled applications, encryption, digital rights management, voice recognition, and voice replication.

In conjunction with touch screen 1012, display controller 1056, contact module 1030, graphics module 1032, and text input module 1034, contacts module 1037 may be used to manage an address book or contact list (e.g., stored in application internal state 1092 of contacts module 1037 in memory 1002), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1038, video conference 1039, e-mail 1040, or IM 1041; and so forth.

In conjunction with RF circuitry 1008, audio circuitry 1010, speaker 1011, microphone 1013, touch screen 1012, display controller 1056, contact module 1030, graphics module 1032, and text input module 1034, telephone module 1038 may be used to enter a sequence of characters corresponding to a telephone number, access one or more telephone numbers in address book 1037, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 1008, audio circuitry 1010, speaker 1011, microphone 1013, touch screen 1012, display controller 1056, optical sensor 1064, optical sensor controller 1058, contact module 1030, graphics module 1032, text input module 1034, contact list 1037, and telephone module 1038, videoconferencing module 1039 includes executable instructions to initiate, conduct, and terminate a video conference between a user and one or more other participants in accordance with user instructions.

In conjunction with RF circuitry 1008, touch screen 1012, display controller 1056, contact module 1030, graphics module 1032, and text input module 1034, e-mail client module 1040 includes executable instructions to create, send, receive, and manage e-mail in response to user instructions. In conjunction with image management module 1044, e-mail client module 1040 makes it very easy to create and send e-mails with still or video images taken with camera module 1043.

In conjunction with RF circuitry 1008, touch screen 1012, display controller 1056, contact module 1030, graphics module 1032, and text input module 1034, the instant messaging module 1041 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1008, touch screen 1012, display controller 1056, contact module 1030, graphics module 1032, text input module 1034, GPS module 1035, map module 1054, and music player module 1046, workout support module 1042 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1012, display controller 1056, optical sensor(s) 1064, optical sensor controller 1058, contact module 1030, graphics module 1032, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, contact module 1030, graphics module 1032, text input module 1034, and camera module 1043, image management module 1044 includes executable instructions to arrange, modify (e.g., edit), or otherwise manipulate, label, delete, present (e.g., in a digital slide show or album), and store still and/or video images.

In conjunction with RF circuitry 1008, touch screen 1012, display system controller 1056, contact module 1030, graphics module 1032, and text input module 1034, browser module 1047 includes executable instructions to browse the Internet in accordance with user instructions, including searching, linking to, receiving, and displaying web pages or portions thereof, as well as attachments and other files linked to web pages.

In conjunction with RF circuitry 1008, touch screen 1012, display system controller 1056, contact module 1030, graphics module 1032, text input module 1034, e-mail client module 1040, and browser module 1047, calendar module 1048 includes executable instructions to create, display, modify, and store calendars and data associated with calendars (e.g., calendar entries, to do lists, etc.) in accordance with user instructions.

In conjunction with RF circuitry 1008, touch screen 1012, display system controller 1056, contact module 1030, graphics module 1032, text input module 1034, and browser module 1047, widget modules 1049 are mini-applications that may be downloaded and used by a user (e.g., weather widget 1049-1, stocks widget 1049-2, calculator widget 1049-3, alarm clock widget 1049-4, and dictionary widget 1049-5) or created by the user (e.g., user-created widget 1049-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1008, touch screen 1012, display system controller 1056, contact module 1030, graphics module 1032, text input module 1034, and browser module 1047, the widget creator module 1050 may be used by a user to create widgets (e.g., turning a user-specified portion of a web page into a widget).

In conjunction with touch screen 1012, display system controller 1056, contact module 1030, graphics module 1032, and text input module 1034, search module 1051 includes executable instructions to search for text, music, sound, image, video, and/or other files in memory 1002 that match one or more search criteria (e.g., one or more user-specified search terms) in accordance with user instructions.

In conjunction with touch screen 1012, display system controller 1056, contact module 1030, graphics module 1032, audio circuitry 1010, speaker 1011, RF circuitry 1008, and browser module 1047, video and music player module 1052 includes executable instructions that allow the user to download and play back recorded music and other sound files stored in one or more file formats, such as MP3 or AAC files, and executable instructions to display, present or otherwise play back videos (e.g., on touch screen 1012 or on an external, connected display via external port 1024). In some embodiments, device 1000 may include the functionality of an MP3 player, such as an iPod (trademark of Apple Inc.).

In conjunction with touch screen 1012, display controller 1056, contact module 1030, graphics module 1032, and text input module 1034, notes module 1053 includes executable instructions to create and manage notes, to do lists, and the like in accordance with user instructions.

In conjunction with RF circuitry 1008, touch screen 1012, display system controller 1056, contact module 1030, graphics module 1032, text input module 1034, GPS module 1035, and browser module 1047, map module 1054 may be used to receive, display, modify, and store maps and data associated with maps (e.g., driving directions; data on stores and other points of interest at or near a particular location; and other location-based data) in accordance with user instructions.

In conjunction with touch screen 1012, display system controller 1056, contact module 1030, graphics module 1032, audio circuitry 1010, speaker 1011, RF circuitry 1008, text input module 1034, e-mail client module 1040, and browser module 1047, online video module 1055 includes instructions that allow the user to access, browse, receive (e.g., by streaming and/or download), play back (e.g., on the touch screen or on an external, connected display via external port 1024), send an e-mail with a link to a particular online video, and otherwise manage online videos in one or more file formats, such as H.264. In some embodiments, instant messaging module 1041, rather than e-mail client module 1040, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

FIG. 9 is a block diagram illustrating exemplary components for event handling in accordance with some embodiments. In some embodiments, memory 1002 (in FIG. 10) includes event sorter 170 (e.g., in operating system 1026) and a respective application 1036-1 (e.g., any of the aforementioned applications 1037-1051, 1055).

Event sorter 1070 receives event information and determines the application 1036-1 and application view 1091 of application 1036-1 to which to deliver the event information. Event sorter 1070 includes event monitor 1071 and event dispatcher module 1074. In some embodiments, application 1036-1 includes application internal state 1092, which indicates the current application view(s) displayed on touch sensitive display 1012 when the application is active or executing. In some embodiments, device/global internal state 1057 is used by event sorter 1070 to determine which application(s) is (are) currently active, and application internal state 1092 is used by event sorter 1070 to determine application views 1091 to which to deliver event information.

In some embodiments, application internal state 1092 includes additional information, such as one or more of: resume information to be used when application 1036-1 resumes execution, user interface state information that indicates information being displayed or that is ready for display by application 1036-1, a state queue for enabling the user to go back to a prior state or view of application 1036-1, and a redo/undo queue of previous actions taken by the user.

Event monitor 1071 receives event information from peripherals interface 1018. Event information includes information about a sub-event (e.g., a user touch on touch sensitive display 1012, as part of a multi-touch gesture). Peripherals interface 1018 transmits information it receives from I/O subsystem 1006 or a sensor, such as proximity sensor 1066, orientation sensor(s) 1068, and/or microphone 1013 (through audio circuitry 1010). Information that peripherals interface 1018 receives from I/O subsystem 1006 includes information from touch-sensitive display 1012 or a touch-sensitive surface.

In some embodiments, event monitor 1071 sends requests to the peripherals interface 1018 at predetermined intervals. In response, peripherals interface 1018 transmits event information. In other embodiments, peripheral interface 1018 transmits event information only when there is a significant event (e.g., receiving an input above a predetermined noise threshold and/or for more than a predetermined duration).

In some embodiments, event sorter 1070 also includes a hit view determination module 1072 and/or an active event recognizer determination module 1073.

Hit view determination module 1072 provides software procedures for determining where a sub-event has taken place within one or more views, when touch sensitive display 1012 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 1072 receives information related to sub-events of a touch-based gesture. When an application has multiple views organized in a hierarchy, hit view determination module 1072 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 1073 determines which view or views within a view hierarchy should receive a particular sequence of sub-events. In some embodiments, active event recognizer determination module 1073 determines that only the hit view should receive a particular sequence of sub-events. In other embodiments, active event recognizer determination module 1073 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 1080). In embodiments including active event recognizer determination module 1073, event dispatcher module 1074 delivers the event information to an event recognizer determined by active event recognizer determination module 1073. In some embodiments, event dispatcher module 1074 stores in an event queue the event information, which is retrieved by a respective event receiver module 1082.

In some embodiments, operating system 1026 includes event sorter 1070. Alternatively, application 1036-1 includes event sorter 1070. In yet other embodiments, event sorter 1070 is a stand-alone module, or a part of another module stored in memory 1002, such as contact/motion module 1030.

In some embodiments, application 1036-1 includes multiple event handlers 1090 and one or more application views 1091, each of which includes instructions for handling touch events that occur within a respective view of the application's user interface. Each application view 1091 of the application 1036-1 includes one or more event recognizers 1080. Typically, a respective application view 1091 includes multiple event recognizers 1080. In other embodiments, one or more of event recognizers 1080 are part of a separate module, such as a user interface kit (not shown) or a higher level object from which application 1036-1 inherits methods and other properties. In some embodiments, a respective event handler 1090 includes one or more of: data updater 1076, object updater 1077, GUI updater 1078, and/or event data 1079 received from event sorter 1070. Event handler 1090 may utilize or call data updater 1076, object updater 1077 or GUI updater 1078 to update the application internal state 1092. Alternatively, one or more of the application views 1091 includes one or more respective event handlers 1090. Also, in some embodiments, one or more of data updater 1076, object updater 1077, and GUI updater 1078 are included in a respective application view 1091.

A respective event recognizer 1080 receives event information (e.g., event data 1079) from event sorter 1070, and identifies an event from the event information. Event recognizer 1080 includes event receiver 1082 and event comparator 1084. In some embodiments, event recognizer 1080 also includes at least a subset of: metadata 1083, and event delivery instructions 1088 (which may include sub-event delivery instructions).

Event receiver 1082 receives event information from event sorter 1070. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 1084 compares the event information to predefined event or sub-event definitions and, based on the comparison, determines an event or sub-event, or determines or updates the state of an event or sub-event. In some embodiments, event comparator 1084 includes event definitions 1086. Event definitions 1086 contain definitions of events (e.g., predefined sequences of sub-events), for example, event 1 (1087-1), event 2 (1087-2), and others. In some embodiments, sub-events in an event 1087 include, for example, touch begin, touch end, touch movement, touch cancellation, and multiple touching. In one example, the definition for event 1 (1087-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (1087-2) is a dragging on a displayed object. The dragging, for example, includes a touch (or contact) on the displayed object for a predetermined phase, a movement of the touch across touch-sensitive display 1012, and lift-off of the touch (touch end). In some embodiments, the event also includes information for one or more associated event handlers 1090.

In some embodiments, event definition 1087 includes a definition of an event for a respective user-interface object. In some embodiments, event comparator 1084 performs a hit test to determine which user-interface object is associated with a sub-event. For example, in an application view in which three user-interface objects are displayed on touch-sensitive display 1012, when a touch is detected on touch-sensitive display 1012, event comparator 1084 performs a hit test to determine which of the three user-interface objects is associated with the touch (sub-event). If each displayed object is associated with a respective event handler 1090, the event comparator uses the result of the hit test to determine which event handler 1090 should be activated. For example, event comparator 1084 selects an event handler associated with the sub-event and the object triggering the hit test.

In some embodiments, the definition for a respective event 1087 also includes delayed actions that delay delivery of the event information until after it has been determined whether the sequence of sub-events does or does not correspond to the event recognizer's event type.

When a respective event recognizer 1080 determines that the series of sub-events do not match any of the events in event definitions 1086, the respective event recognizer 1080 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 1080 includes metadata 1083 with configurable properties, flags, and/or lists that indicate how the event delivery system should perform sub-event delivery to actively involved event recognizers. In some embodiments, metadata 1083 includes configurable properties, flags, and/or lists that indicate how event recognizers may interact with one another. In some embodiments, metadata 1083 includes configurable properties, flags, and/or lists that indicate whether sub-events are delivered to varying levels in the view or programmatic hierarchy.

In some embodiments, a respective event recognizer 1080 activates event handler 1090 associated with an event when one or more particular sub-events of an event are recognized. In some embodiments, a respective event recognizer 1080 delivers event information associated with the event to event handler 1090. Activating an event handler 1090 is distinct from sending (and deferred sending) sub-events to a respective hit view. In some embodiments, event recognizer 1080 throws a flag associated with the recognized event, and event handler 1090 associated with the flag catches the flag and performs a predefined process.

In some embodiments, event delivery instructions 1088 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 1076 creates and updates data used in application 1036-1. For example, data updater 1076 updates the telephone number used in contacts module 1037, or stores a video file used in video player module 1045. In some embodiments, object updater 1077 creates and updates objects used in application 1036-1. For example, object updater 1076 creates a new user-interface object or updates the position of a user-interface object. GUI updater 1078 updates the GUI. For example, GUI updater 1078 prepares display information and sends it to graphics module 1032 for display on a touch-sensitive display.

In some embodiments, event handler(s) 1090 includes or has access to data updater 1076, object updater 1077, and GUI updater 1078. In some embodiments, data updater 1076, object updater 1077, and GUI updater 1078 are included in a single module of a respective application 1036-1 or application view 1091. In other embodiments, they are included in two or more software modules.

It shall be understood that the foregoing discussion regarding event handling of user touches on touch-sensitive displays also applies to other forms of user inputs to operate multifunction devices 1000 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 11 illustrates a portable multifunction device 1000 having a touch screen 1012 in accordance with some embodiments. The touch screen may display one or more graphics within user interface (UI) 1200. In this embodiment, as well as others described below, a user may select one or more of the graphics by making a gesture on the graphics, for example, with one or more fingers 1202 (not drawn to scale in the figure) or one or more styluses 1203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 1000. In some embodiments, inadvertent contact with a graphic may not select the graphic. For example, a swipe gesture that sweeps over an application icon may not select the corresponding application when the gesture corresponding to selection is a tap.

Device 1000 may also include one or more physical buttons, such as "home" or menu button 1204. As described previously, menu button 1204 may be used to navigate to any application 1036 in a set of applications that may be executed on device 1000. Alternatively, in some embodiments, the menu button is implemented as a soft key in a GUI displayed on touch screen 1012.

In one embodiment, device 1000 includes touch screen 1012, menu button 1204, push button 1206 for powering the device on/off and locking the device, volume adjustment button(s) 1208, Subscriber Identity Module (SIM) card slot 1210, head set jack 1212, and docking/charging external port 1024. Push button 1206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the following examples will be given with reference to inputs on touch screen 1012 (where the touch sensitive surface and the display are combined), a touch-sensitive surface that is separate from the display may be used instead of touch screen 1012.

Example Mapping Functionality

FIG. 12 illustrates another example of a multifunction device, which may be configured in a manner similar to the multifunction device described above. In the illustrated embodiment, a multifunction device 1400 includes a mapping application (e.g., map module 1054 described above) that may be stored in one or more memories of multifunction device 1400 and executed on one or more processors of multifunction device 1400. As is the case for the multifunction device described above, multifunction device 1400 may include one or more controls 1402 for operating the multifunction device. These controls may include but are not limited to power controls for turning the device on and off, volume controls for adjusting the ear piece volume or the speaker volume, menu controls for navigation functions of the device, and function controls for initiating one or more function or actions on the device. Controls 1402 may include hardware controls or software controls. For instance, the bottom left corner of electronic display 1412 includes a graphical representation of a control 1412 that may be selected by a user, such as by way of touch in accordance with the touch screen functionality described above. Multifunction device 1400 may also include other components similar to those described above, such as a microphone 1404, an earpiece 1406 (e.g., a speaker through which to convey audio representations of telephone calls), an optical sensor 1408, and/or a speaker 1410. Each of these components may be configured in a similar manner to those like-named components of FIG. 11 described above. Furthermore, electronic display 1412 may be configured with touch screen capability, such as touch screen 1012 described above. In various embodiments, controls (e.g., on screen control(s) 1402) may be utilized to perform any of a variety of map-related functions including but not limited to zoom in, zoom out, rotate screen, pan screen, toggle views (e.g., two-dimensions to three dimensions and vice versa), and/or another map related activity. In various embodiments, one or more gestures may be utilized to perform any of the aforesaid map controls (with or without the use of an actual graphical on-screen control). In one non-limiting example, a one figure gesture may be utilized to adjust the pitch within a three-dimensional map view.

As noted above, multifunction device 1400 includes a mapping application that may be stored in one or more memories of multifunction device 1400 and executed on one or more processors of multifunction device 1400. In the illustrated embodiment, the graphical representation of the mapping application may include a map 1414 of a geographic region. This map may be presented as a two-dimensional map or a three-dimensional map, the selection of which may be specified through, e.g., a user-configurable parameter of the mapping application. In some embodiments, the multifunction device may toggle between two-dimensional map or three-dimensional map views responsive to input from any input component of the multifunction device. In one non-limiting example, input from orientation sensor(s) 1068 may initiate the transition from a two-dimensional map view to a three-dimensional map, and vice versa. For instance, one or more of orientation sensor(s) 1068 may detect a tilt (e.g., a user-initiated tilt) in the orientation of the multifunction device and, in response, initiate the aforesaid toggling.

Map 1414 may include a graphical position indicator 1416, which may represent the location of the multifunction device within the geographic region of the map. Generally position indicator 1416 may represent the current or real-time position of the multifunction device, although it should be understood that in some cases there may exist some small amount of temporal latency between the actual position of the multifunction device and the graphical representation of that location (e.g., position indicator 1416). This may occur, e.g., when the multifunction device is in motion. In various embodiments, the multifunction device may be configured to perform map matching including but not limited to aligning a sequence of observed user positions with a road network on a digital map. In various embodiments, the multifunction device may be configured to perform a "snap to" function in which the graphical position indicator 1416 is aligned onto a roadway when the user's position falls within in a specified threshold distance of the roadway.

Furthermore, multifunction device 1400 may generally be operated by a user. For example, multifunction device 1400 may in some cases be a smartphone utilized by an individual to make phone calls, send text messages, browse the internet, etc. As use of multifunction device by an individual generally implies the individual is proximate to the multifunction device (e.g., the user may be holding the device in his or her hand), references herein to the location of the device and the location of the user may be considered to be synonymous. However, it should be understood that in some cases the actual position of the multifunction device and the user of that device may differ by some distance. For instance, the user may place his or her multifunction device on a table of an outdoor café while sitting in a nearby chair. In this case, the position of the device and the position of the user may differ by some small amount. In another example, multifunction device 1400 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the multifunction device and the position of the multifunction device user may be considered to coincide.

In various embodiments, the map 1414 displayed by the multifunction device may include one or more roads (e.g., roads 1418*a-b*), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but limited to readouts from one or more of a directional compass, an altimeter, and/or a thermometer.

In various embodiments, the mapping application may be configured to generate directions from an origination (e.g., an address or a user's current position) to a destination (e.g., an address, landmark, bookmarked/saved location, or point of interest). For instance, an indication of the origination and/or destination may be input into the multi-function device by the user. The multifunction device may generate one or more candidate routes between those two points. The multifunction device may select one of those routes for display on the device. In other cases, multiple candidate routes may be presented to the user and the user may select a preferred route. In the illustrated embodiment, one route is illustrated as route 1420. The route may also include turn-by-turn directions which may be presented to the user (in 2D or 3D), such as a graphical indication to perform a turn 1422*a* from road 1418*a* to road 1418*b*. In some embodiments, this graphical indication to perform a turn may be supplemented or substituted with an audible indication to turn, such as a voice command from speaker 1410 that indicates the user is to "turn left in 100 yards," for example. In some embodiments, the route that is selected may be presented to the user as a route overview. For instance, before proceeding with navigation, the multifunction device may generate a route overview display that graphically indicates key information for the route, such as key turns, route distance and/or an estimated time for traversing the route. In some cases, the multifunction device may be configured to generate a display of driving maneuvers (e.g., turns, lane changes, etc.) that occur in quick succession, either in the route overview or during actual navigation. This information may help the user safely prepare for such maneuvers. In some cases, the route information may be presented in a list format, such as a list of turns or other maneuvers.

In various embodiments, the mapping application of the multifunction device may be configured to track the position of the user over time and correspondingly adjust the graphical position indicator 1416 to indicate the new position. For instance, the mapping application may determine that the user is traveling along route 1420 from position information (e.g., information from GPS module 1035) and update the map 1414 accordingly. For instance, in some cases the map 1414 may remain stationary while position indicator 1416 is moved along the route. In other cases, position indicator 1416 may remain stationary or "fixed" while map 1414 is moved (e.g., panned, turned, etc.) around the position indicator.

In various embodiments, the multifunction device may be configured to display alternate or contingency routes. In some cases, these routes may be selectable by the user (e.g., via the touch screen interface). In other cases, the multifunction device may select a best route based on one or more parameters, such as shortest distance or time. In some cases, these parameters or preferences may be set by the user.

As described in more detail below, the multifunction device may in various embodiments receive routing information that specifies a route from a map service. In some case, the multifunction device may carry out navigation guidance in accordance with this route. However, in some cases, the multifunction device may perform a reroute operation in order to generate a new route to the destination. For instance, the user may have deviated from the original route or explicitly requested a new route. In some cases, the multifunction device may perform rerouting based on cached map data stored on the multifunction device.

In various embodiments, the multifunction device may be configured to perform route correction based on real-time data, such as updates in map information, road conditions, traffic conditions, and/or weather conditions. For instance, the multifunction device may be configured to alter a route such that the route avoids a construction zone or a dangerous storm cell.

In various embodiments, the multifunction device may be configured to perform lane guidance independently or as part of navigation guidance. For instance, the multifunction device may, in response to detecting that multiple turns follow in quick succession, provide the user with a direction or suggestion as to which lane to occupy. For instance, a voice or visual indication may specify that the user "turn right, then move to the left lane" in anticipation of a subsequent left turn. In another example, the multifunction device may detect one or more lane closures (e.g., due to construction or other reasons) and instruct the user to avoid such lanes.

In various embodiments, the multifunction device may be configured to generate voice prompts for directions. For instance, during navigation guidance, the multifunction device may be configured to generate audio representations of the next turn or driving maneuver on the route. For instance, the multifunction device may be configured to audibly indicate the user should "turn left in 100 yards" or some other audible indication of a maneuver.

In various embodiments, the multifunction device may be responsive to various voice commands for performing actions including a command to obtain a route. For instance, the multifunction device may interpret the user's voice through a microphone or other transducer of the multifunction device. The user may specify an origination and a destination for the requested route. In various embodiments, the multifunction device may be configured to utilize the user's current location as the origination for the route.

In various embodiments, the multifunction device may be configured to perform a search along a specific route, such as current navigation route. For instance, the user of the multifunction device may request the location of points of interest, such as fuel stations or restaurants. However, if a user is traveling along a particular route, they may not be particularly interested in points of interest that are not proximate to that route. As such, the multifunction device may be configured to scope any searches to points of interested within a specified distance away from the route. In various embodiments, this distance may be a configurable parameter.

In various embodiments, the multifunction device may be configured to display various graphical layers including but not limited to a graphical map information, aerial images (e.g., satellite-acquired images), and/or traffic information. For instance, in the traffic information example, the multifunction device may overlay color coded traffic information on roadways to indicate the speed at which traffic is flowing. For example, green color coding may be used to indicate traffic is flowing normally, and yellow or red may be used to indicate traffic slowdowns.

In various embodiments, the multifunction device may be configured to display any quantity of metrics or statistics about a navigation route including but not limited to an estimated time of arrival, travel distance remaining, average speed (overall or moving average), top speed, and/or other route statistics.

In various embodiments, the multifunction device may be configured to display routes at different angles in order to accommodate the preferences of different users. Such viewing angles may include a bird's eye view for two-dimensional maps to any of a variety of camera angles available for a three-dimensional map.

In various embodiments, the multifunction device may be configured to provide navigation information other than map and routing information. For instance the multifunction device may expose output from any of the hardware device described above with respect to FIG. 9. In one non-limiting example, an orientation sensor 1068 may include a compass that outputs direction data. The multifunction device described herein may be configured to display this directional data as a virtual compass, for example.

Example System

Figure 13:
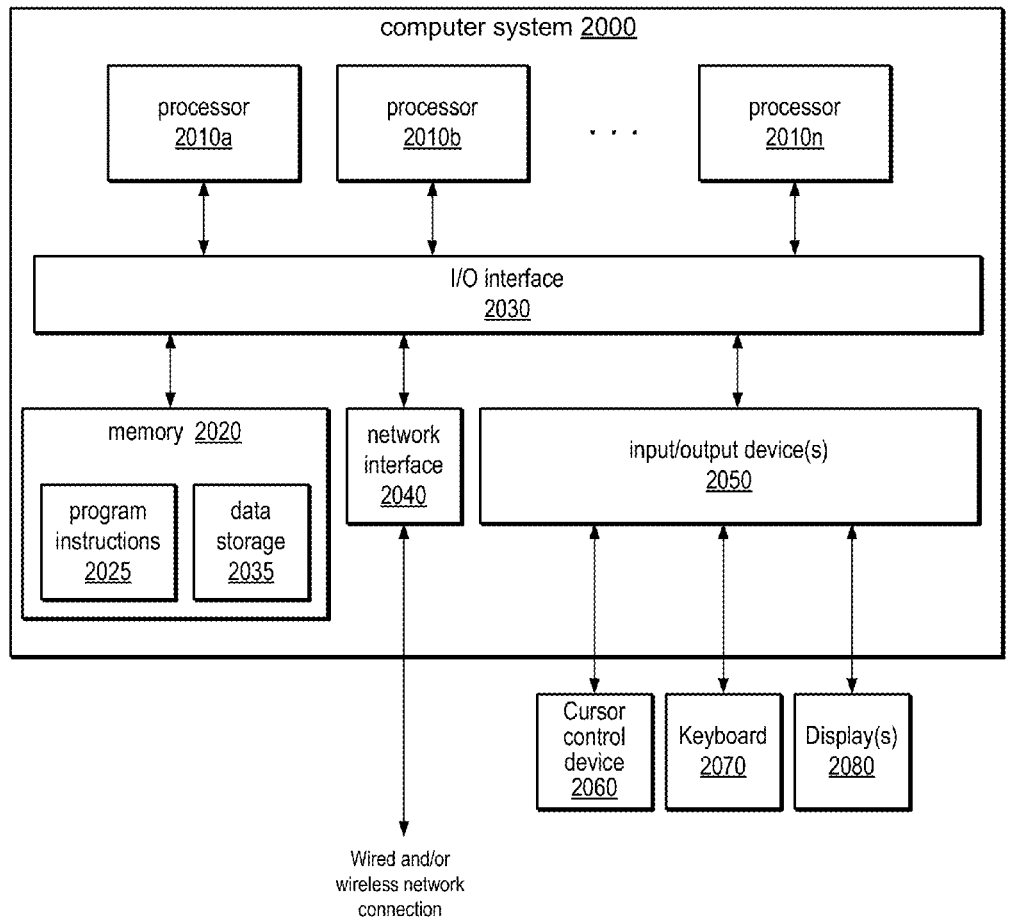
FIG. 13 illustrates an example system, according to some embodiments.

Embodiments of the method for selectively obtaining map image data according to virtual camera velocity as described herein may be executed on one or more computer systems such as the map service 130, which may interact with various other devices. One such computer system is illustrated by FIG. 13. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-client device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the method for rendering a map according to a stylesheet as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 13, memory 2020 may include program instructions 2025, configured to implement embodiments of the method for selectively obtaining map image data according to virtual camera velocity as described herein, and data storage 2035, comprising various data accessible by program instructions 2025. In one embodiment, program instructions 2025 may include software elements of embodiments of the method selectively obtaining map image data according to virtual camera velocity, as illustrated in FIG. 8. Data storage 2035 may include data that may be used in embodiments. In other embodiments, other or different software elements and data may be included.

Those skilled in the art will appreciate that computer system 2000 is merely illustrative and is not intended to limit the scope of the method for rendering a map according to a stylesheet as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

What is claimed is:

1. A method, comprising:
performing, by a computing device implementing a map application, wherein said map application displays a map view of a map, wherein said map view is displayed based on preexistent map image data identified according to a virtual camera, comprising:
  detecting a velocity of the virtual camera;
  selecting the preexistent map image data for the map view of the map corresponding to a particular level-of-detail, wherein the particular level-of-detail is one of a plurality of levels-of-detail each corresponding to different respective map image data previously generated for the map view of a same area of the map, wherein the particular level-of-detail is determined according to the velocity of the virtual camera; and
  obtaining the selected preexistent map image data.

2. The method of claim 1, wherein said detecting the velocity of the virtual camera comprises determining a velocity of a rotation of the virtual camera in a fixed position.

3. The method of claim 1, wherein said selecting the preexistent map image data for the map view of the map corresponding to the particular level-of-detail comprises:
  determining whether the detected velocity exceeds a velocity threshold; and
  in response to determining that the detected velocity exceeds a velocity threshold, specifying the particular level-of-detail for the map image data.

4. The method of claim 3, wherein said specifying the particular level-of-detail for the preexistent map image data comprises selecting the particular level-of-detail for the preexistent map image data according to a distance from the virtual camera to a location of the map image data in a virtual space.

5. The method of claim 1, wherein the map image data is obtained from a server.

6. The method of claim 1, wherein the preexistent map image data is obtained from accessing map image data stored at the computing device.

7. The method of claim 1, further comprising:
  determining whether all of the selected preexistent map image data for the map view of the map according to the velocity of the virtual camera is obtained; and
  in response to determining all of the selected preexistent map image data for the map view map according to the velocity of the virtual camera is obtained:
    obtaining different preexistent map image data corresponding to a different level-of-detail of the plurality of levels-of detail that is determined independent of the detected velocity of the virtual camera.

8. A system, comprising:
  at least one processor; and
  a memory comprising program instructions, wherein the program instructions implement a map application, wherein said map application displays a map view of a map, wherein said map view is displayed based on preexistent map image data identified according to a virtual camera, executable by the at least one processor to:
    detect a velocity of the virtual camera;
    select the preexistent map image data for the map view of the map corresponding to a particular level-of-detail, wherein the particular level-of-detail is one of a plurality of levels-of-detail each corresponding to different respective map image data previously generated for the map view of a same area of the map wherein the particular level-of-detail is determined according to the velocity of the virtual camera; and
    obtain the selected preexistent map image data.

9. The system of claim 8, wherein, to detect the velocity of the virtual camera, the program instructions are executable by the at least one processor to analyze input from one or more orientation sensors that move the virtual camera.

10. The system of claim 8, wherein, to detect the velocity of the virtual camera, the program instructions are executable by the at least one processor to analyze input from a touch-enabled input device that manipulates the virtual camera.

11. The system of claim 8, wherein, to select the preexistent map image data for the map view of the map corresponding to the particular level-of-detail, the program instructions implement a map application executable by the at least one processor to:
  determine whether the detected velocity exceeds a velocity threshold; and
  in response to determining that the detected velocity exceeds a velocity threshold, specify the level-of-detail for the map image data.

12. The system of claim 8, wherein the preexistent map image data obtained comprises two or more areas, wherein at least one of said two or more areas comprises vector graphics data, and wherein at least one other of said two or more areas comprises raster graphics data.

13. A non-transitory computer-readable storage medium, storing program instructions, wherein the program instructions when executed by one or more computing devices cause the one or more computing devices to implement a map application, wherein the map application displays a map view of a map, wherein the map view is displayed based on preexistent map image data identified according to a virtual camera, and wherein the map application implements:
  detecting a velocity of the virtual camera;
  selecting the preexistent map image data for the map view of the map corresponding to a particular level-of-detail, wherein the particular level-of-detail is one of a plurality of levels-of-detail each corresponding to different respective map image data previously generated for the map view of a same area of the map, wherein the particular level-of-detail is determined according to the velocity of the virtual camera; and
  obtaining the selected preexistent map image data.

14. The non-transitory, computer-readable storage medium of claim 13, wherein, in said detecting the velocity of the virtual camera, the map application implements determining a velocity of a rotation of the virtual camera in a fixed position.

15. The non-transitory, computer-readable storage medium of claim 13, wherein, in said selecting the preexistent map image data for the map view of the map corresponding to the particular level-of-detail, the map application implements:
  determining whether the detected velocity exceeds a velocity threshold; and
  in response to determining that the detected velocity exceeds a velocity threshold, specifying the particular level-of-detail for the preexistent map image data.

16. The non-transitory, computer-readable storage medium of claim 15, wherein in said specifying the particular level-of-detail for the preexistent map image data, the map application implements selecting the particular level-of-detail for the preexistent map image data according to a distance from the virtual camera to a location of the map image data in a virtual space.

17. The non-transitory, computer-readable storage medium of claim 13, wherein the obtained map image data comprises one or more map tiles, wherein at least one of the one or more map tiles comprises two or more areas, wherein at least one of said two or more areas comprises vector graphics data, and wherein at least one other of said two or more areas comprises raster graphics data.

18. An electronic navigation device, comprising:
an electronic display;
a navigation component, wherein said navigation component displays a navigation view of a map, wherein said navigation view is displayed according to a virtual camera, configured to:
detect a velocity of the virtual camera;
select preexistent map image data for the navigation view of the map corresponding to a particular level-of-detail according to the velocity of the virtual camera, wherein the particular level-of-detail is one of a plurality of levels-of-detail each corresponding to different respective map image data previously generated for the map view of a same area of the map, wherein the selection comprises:
determine whether the detected velocity exceeds a velocity threshold; and
in response to a determination that the detected velocity exceeds a velocity threshold, specify the particular level-of-detail for the preexistent map image data;
obtain the selected preexistent map image data; and
display the obtained preexistent map image data.

19. The device of claim 18, further comprising:
a positioning component configured to determine a current location of the electronic navigation device;
wherein, to determine whether the detected velocity exceeds the velocity threshold, the navigation component is configured to analyze location data obtained from the position component.

20. The system of claim 18, wherein, to specify the particular level-of-detail for the preexistent map image data, the navigation component is configured to select the particular level-of-detail for the map image data according to a distance from the virtual camera to a location of the map image data in a virtual space.

21. A multi-function device, comprising:
a touch-sensitive display;
at least one processor; and
a memory comprising program instructions, wherein the program instructions cause the at least one processor to implement a map application, wherein the map application displays a map view of a map, wherein the map view is displayed based on preexistent map image data identified according to a virtual camera, and wherein the map application is configured to:
detect a velocity of the virtual camera;
select the preexistent map image data for the navigation view of the map corresponding to a particular level-of-detail according to the velocity of the virtual camera, wherein the particular level-of-detail is one of a plurality of levels-of-detail each corresponding to different respective map image data previously generated for the map view of a same area of the map, the selection, wherein the selection comprises:
determine whether the detected velocity exceeds a velocity threshold; and
in response to a determination that the detected velocity exceeds a velocity threshold, specify the particular level-of-detail for the preexistent map image data;
obtain the selected preexistent map image data; and
display the obtained preexistent map image data on the touch-sensitive display.

22. The device of claim 21, wherein, to detect the velocity of the virtual camera, the map application is configured to analyze touch input obtained via the touch-sensitive display to determine the virtual camera velocity.

23. The device of claim 21, further comprising:
one or more orientation sensors;
wherein, to detect the velocity of the virtual camera, the map application is configured to analyze the one or more orientation sensors to determine the virtual camera velocity.

24. The device of claim 21, wherein, to specify the particular level-of-detail for the preexistent map image data, the map application is configured to select the particular level-of-detail for the preexistent map image data according to a distance from the virtual camera to a location of the map image data in a virtual space.

25. The device of claim 21, wherein the obtained map image data is obtained from the device memory.

* * * * *